US006649925B2

(12) United States Patent
Talmi

(10) Patent No.: US 6,649,925 B2
(45) Date of Patent: Nov. 18, 2003

(54) METHODS OF CALIBRATING A POSITION MEASUREMENT DEVICE

(76) Inventor: Amos Talmi, Kibbutz, Ramat-Hashofet 19238 (IL)

(*) Notice: Subject to any disclaimer, the term of this patent is extended or adjusted under 35 U.S.C. 154(b) by 25 days.

(21) Appl. No.: 10/013,437

(22) Filed: Dec. 10, 2001

(65) Prior Publication Data
US 2002/0079466 A1 Jun. 27, 2002

Related U.S. Application Data

(62) Division of application No. 09/424,653, filed as application No. PCT/IL97/00170 on May 27, 1997, now Pat. No. 6,333,511.

(51) Int. Cl.[7] .............................................. G01N 21/86
(52) U.S. Cl. ................... 250/559.1; 250/559.29
(58) Field of Search ...................... 250/559.1, 559.29, 250/559.3, 559.36, 559.4, 231.13, 231.16, 231.18, 237 R; 356/616, 617, 228, 227; 341/13

(56) References Cited

U.S. PATENT DOCUMENTS 4,441,819 A * 4/1984 Takeuchi et al. ............. 356/629
4,673,810 A    6/1987 Babsch et al.
4,864,149 A    9/1989 Matsumoto

FOREIGN PATENT DOCUMENTS

DE    34 18 798    11/1985
GB    2 298 482    9/1996

OTHER PUBLICATIONS

Patent abstracts of Japan; vol. 6, No. 66 (P–112); Apr. 27, 1982 & JP 57 007516 A; (Tokyo Shibaura Denki K. K.); Jan. 14, 1982.
Heidenhain, Johannes; "Measuring Principle"; General Catalog; pp. 6–7; Jun. 1996.

* cited by examiner

Primary Examiner—Que T. Le
(74) Attorney, Agent, or Firm—Fenster & Company

(57) ABSTRACT

A method of calibrating a position measurement device which device utilizes signals from a plurality of detectors, more than two of which view at least one edge between a dark region and a light region at any one position, comprising:

measuring the signals of the plurality of detectors at a plurality of positions with respect to the edge; and calculating at least one average of some of the measured signals from individual ones of the detectors that do not view the edge at the position; and calibrating the individual detectors based on averages.

27 Claims, 16 Drawing Sheets

METHODS OF CALIBRATING A POSITION MEASUREMENT DEVICE

RELATED APPLICATIONS

This application is a divisional application of U.S. pat. application Ser. No. 09/424,653, filed Nov. 26, 1999, now U.S. Pat. No. 6,333,511, which is the U.S. National filing of PCT Application PCT/IL97/00170, filed May 27, 1997.

FIELD OF THE INVENTION

The present invention relates to methods and apparatus for precise position determination and in particular to a combination of electro-optical methods and apparatus and advanced data processing methods and means for the very precise determination of absolute position and incremental displacement of objects.

BACKGROUND OF THE INVENTION

Prior art electro-optical apparatus for the determination of the position of a rotational objects is shown in FIG. 1. A light-opaque mask 12 having light-transparent apertures 20 is rigidly attached to and moves with an object 22, whose angular position is to be determined. Light rays emitted from a light source 10, impinge on the mask 12 and a light flux passing through the apertures in the plate is detected by a light detecting device 14, which is aligned with the mask and the source to measure the light flux.

As different apertures 20, in the mask 12 pass in front of detector 14, an output signal is obtained from detector 14 which determines the position of object 22 with the aid of a position reporting device 18.

The problems associated with this type of apparatus and this method for position determination relate principally to limitations in position determination accuracy. Best positional accuracy obtained with this method and similar prior art methods is of the order of 1 micrometer.

The reasons for this accuracy limitation can be traced to the fact that light passing through an aperture and detected by a light sensor is registered either as a zero or as a one, i.e., there are no fractional measurements; thus, the positional accuracy is determined only by detection and identification of a particular slit through which light passes. Thus, in order to determine very small distance displacements the aperture width and the aperture intervals must be made impossibly small. Physical size, therefore limits the fine range measurements.

Other systems are capable of finding a position of an edge to greater accuracy than the size of the detector by utilizing digitized values at a number of positions as a single detector moves past the edge. The values are used to find the position of the edge. However, such methods are capable of less than an order of magnitude of improvement of resolution and furthermore, they do not measure the position at a point without making measurements at adjacent points. Thus the position of the edge is known only after the detector has moved away from the edge and is therefor not known in real-time, i.e., while the measurement is being made. Such determination of edges is used, for example, in the inspection of reticules for microcircuit production.

The apparatus of FIG. 1 is also sensitive to vibrations which can lead to large errors in position determination. Such prior art apparatus and similar apparatus (as described for example in Japanese Patent Publication No. He-1-22884) is, thus, not suitable for very precise, high resolution position determination.

For more precise positional accuracy determination, of better than 1 micrometer, most prior art devices rely on optical interferometry, which suffers from high sensitivity to vibration. Furthermore, such interferometers are high cost, very delicate apparatus. Examples of such apparatus are described in the General Catalog of Dr. Johannes Heidenhain, GmbH of Traunreut Germany dated June 1996, in particular on pages 6 and 7.

SUMMARY OF THE INVENTION

The object of this invention is to provide techniques, measurement and calibration methods to determine an object's position and displacement with high resolution and accuracy, better than 0.01 micrometers. This accuracy is at least one order of magnitude better than that quoted for the most accurate linear encoder in the above mentioned catalog and two orders of magnitude better than almost all of the listed encoders. Various preferred embodiments of the invention perform such determination for various object positional displacement conditions and geometries. It is noted that the accuracy of the method and apparatus of the present invention is greater (better) than the diffraction limit of the light to which the detectors are sensitive.

In the realization of the above mentioned object of the invention a linear array of light detectors is used to detect the light received from a striped mask which is attached to an object whose position is to be precisely determined. The mask provides a pattern of bright and dark light strips over the linear detector array surface, when it is suitably illuminated.

The method employed in this invention for positional determination is based on determination of the positions of the boundary lines between a plurality, generally a large number of, bright and dark parallel strips of light obtained from the mask. This positional line information is obtained from the detected light level of each of the light detectors in an array (such as a linear or matrix type CCD array). The output of each individual detector is converted into one of many possible digital values, i.e., a gray scale of values is determined. The line position, and thus the object position, are determined from the values provided by the plurality of detectors.

By averaging or otherwise processing the positional data of the light detectors, high accuracy in positional determination is obtained. Preferably, hundreds or thousands of detectors are used, resulting in improved accuracy.

In a preferred embodiment of the invention, apparatus is provided in which a pattern of alternating bright and dark strips illuminate an array of light detectors. In one preferred embodiment the source of the mask strips is a plurality of alternating light transparent and light opaque strips. In another, embodiment a mask utilizes a plurality of alternating light reflecting (white) and light absorbing strips (black). In some preferred embodiments of the invention the strips are oriented at an angle to the direction of position measurement and provide a pattern of alternating bright and dark angled strips across an array of detectors.

The strips are preferably at an angle to the direction of motion (and to the repeat direction of the cell array) which angle is preferably chosen to optimize the number of linear detecting cells. Linear detecting cells are cells in which the boundary lines between bright and dark strips cross both sides of the detector cell which are generally perpendicular to the direction of motion. In this case the output signal from the cell is linearly related to the fraction of the cell area covered by the bright strip. In most embodiments of the invention, only "linear" cells are used in the determination of the position. Generally, the cells are rectangular and the cells are in the linear region and greater accuracy is achieved when the long sides of the detector are perpendicular to the direction of motion.

The detected output signal of each linear cell, is preferably digitized into one of 256 levels which are proportional to the fraction of the cell area illuminated by the bright strip and which enables determination of the bright-dark interface lines position.

Each cell's fractional illumination information is fed to a signal processor which determines the position of the object. The positional information provided by each "linear cell" and by all the linear cells together is used to provide an average position calculation which is more accurate than the positional determination provided by a single cell (typically by at least a factor of 10 and more typically by a factor of 100).

Another aspect of the invention includes the calibration of the sensitivity of each detector cell by moving the subject on which the mask is mounted, so as to allow the area of each cell to be completely illuminated by a bright strip and alternately, to be completely in the shadow of a dark strip, Normalization factors for each cell can be accurately determined.

This normalization is part of a broader aspect of the invention which includes the provision of methods and apparatus for the Auto-Calibration of the light detectors. Such auto calibration is carried out, for example, for each linear detector by measurement and recording of the difference between the position reading as derived from that cell's light measurement and the positional data determined by averaging the positional outputs of all linear detectors. That difference is recorded, for each cell, in the signal processor and used for correction of each cell's output and for provision of more accurate positional data.

Other aspects of the invention provide apparatus for the attainment of accurate average object position in the presence of vibrations, by use of time averaging of position measurements. Also provided, in a preferred embodiment of the invention, are means to ascertain the absolute position of the object by use of specially designed and configured strips and coded strip widths.

In another preferred embodiment of the invention, the illumination of the scale (which is either reflective or transparent), is done by a flashing light pulse of short duration, so as to freeze the object (if it moves) at a well-defined moment in time.

In still another preferred embodiment of the invention, means are provided for the attainment of even higher positional accuracy by improved alignment of detectors in relation to the mask strips and by use of repeated positional measurements and of averaging of the obtained positional data.

There is therefore provided in accordance with a preferred embodiment of the invention, apparatus for the measurement of position of an object in a given direction, comprising:

a one dimensional array of light detectors, comprising a plurality of detectors including at least three detectors, each of which produces a signal at a given position in response to light reaching the detector;

at least one edge between a dark area and a light area viewed by at least one of the plurality of the detectors, which the at least one edge moves, in relation to the plurality of detectors, as the object moves in the given direction; and computing circuitry which receives signals from the at least one detector viewing the at least one edge and determines the position responsive to the signals produced by the at least one detector at the given position.

Preferably, the at least one detector comprises two or more detectors. More preferably, the at least two detectors comprise at least three detectors. Alternatively or additionally, the plurality of detectors comprises at least one detector which views only the bright area and at least one detector which views only the dark area and wherein the computing circuitry receives signals from the at least one detector viewing the edge, the at least one detector viewing the dark area and the at least one detector viewing the bright area and wherein the computing circuitry computes the position responsive to the thus received signals.

Preferably, the position is determined from the ratio between (a) the difference between the signal from the detector which views the edge and the signal which views the bright area and (b) the difference between the signal from the detector which views the bright area and that which views the dark area.

Alternatively or additionally, the at least one edge is perpendicular to the direction of motion. Alternatively, the at least one edge is parallel to the direction of motion. Alternatively, the at least one edge is neither perpendicular nor parallel to the direction of motion.

Alternatively or additionally, the line of detectors is parallel to the direction of motion. Alternatively, the line of detectors is perpendicular to the direction of motion. Alternatively, the line of detectors is neither perpendicular to or parallel with the direction of motion.

Alternatively or additionally, the line of detectors is parallel to the edge. Alternatively, the line of detectors is perpendicular to the edge. Alternatively, the line of detectors is neither parallel nor perpendicular to the edge.

In a preferred embodiment of the invention, each of the at least three detectors is situated at a different position with respect to the position of the edge such that each of the detectors detects a different amount of light depending on its relative position and wherein the computing circuitry detects the position based on the signals produced by the at least three detectors. Preferably, the magnitude of a change in position is determined based on movement of a characteristic derived from the signals produced by the at least three detectors.

Preferably, in any of the above described embodiments, the detectors are rectangular. Alternatively, the detectors are other than rectangular.

In a preferred embodiment of the invention, the detectors view a blurred representation of the edge. Alternatively, the detectors view a focused representation of the edge.

In a preferred embodiment of the invention, the apparatus includes at least one additional linear array of detectors, wherein said at least one additional array and said linear array form a two dimensional array of detectors. Alternatively or additionally, the at least one edge comprises a plurality of edges.

There is also provided in accordance with a preferred embodiment of the invention, apparatus for the measurement of position of an object in a given direction, comprising:

a plurality of light detectors each of which produces a signal at a given position in response to light reaching the detector;

a plurality of edges between dark area and light areas, at least one edge being viewed by at least one detector, which at least one edge moves, in relation to the detectors, as the object moves in the given direction; and computing circuitry which receives signals from the plurality of detectors and determines the given position responsive to the signals produced by the detectors at the given position.

In a preferred embodiment of the invention, the computing circuitry computes a plurality of estimates of position based on different ones of the signals and which determines the position based on a plurality of said estimates.

There is also provided in accordance with a preferred embodiment of the invention, apparatus for the measurement of position of an object in a given direction, comprising:

a plurality of light detectors each of which produces a signal at a given position in response to light reaching the detector;

at least one edge between a dark area and a light area viewed by the plurality of detectors, which at least one edge moves, in relation to the detector, as the object moves in the given direction;

computing circuitry which computes a plurality of estimates of positions based on different ones of the signals produced by the detectors and which determines the given position based on a plurality of said estimates.

Preferably, the estimates are averaged to produce a determined position having an accuracy greater than the accuracy of the individual estimates.

In a preferred embodiment of the invention, the edges are edges of at least one strip. Preferably, the detectors have a first extent in the given direction and the strips have a second extent in the given direction and wherein the second extent is greater than the first extent.

There is also provided in accordance with a preferred embodiment of the invention, apparatus for the measurement of position of an object in a given direction, comprising:

a plurality of light detectors, having a first extent in the given direction, each of said detectors producing a signal at a given position in response to light reaching the detector;

at least one strip, having a second extent in the given direction, and having at least one edge between a dark area and a light area which is viewed by the plurality of detectors, which at least one edge moves, in relation to the detector, as the object moves in the given direction; and computing circuitry which receives signals from the plurality of detectors and determines the given position responsive to the signals produced by the detectors at the given position, the second extent being greater than the first extent.

Preferably, the at least one strip comprises a plurality of parallel strips. Alternatively or additionally, the plurality of strips have different widths or spacings and wherein the computing circuitry determines the strip with which the edge is associated from the width or spacing of the strip.

In a preferred embodiment of the invention, a light detector produces a first signal when it views a dark area and a second signal when it views a light area and the computing circuitry determines the position based on the strength of the signal generated by the detector at the given detector relative to the first and second signals.

Alternatively or additionally, the at least one edge is attached to the object and moves with it. Alternatively, the at least one edge is stationary and is viewed by a detector attached to the moving object.

Alternatively or additionally each of the plurality of detectors has a given extent in the given direction and wherein the computing circuitry determines the position to an accuracy greater than the extent. Preferably, the accuracy is at least 10 times greater than the extent of the detector. More preferably, the accuracy is at least 50 times greater than the extent of the detector. Most preferably, the accuracy is at least 100 times greater than the extent of the detector.

Alternatively or additionally, the computing circuitry determines the position of the object from signals produced only at that position.

In a preferred embodiment of the invention, the signals produced by the detector have a gray level scale of at least 10 gray levels and the gray level values are utilized in the determination of the position.

There is also provided in accordance with a preferred embodiment of the invention, apparatus for the measurement of position of an object in a given direction, comprising:

at least one light detector, said at least one detector producing a signal, having a gray level scale of at least 10 values, at a given position in response to light reaching the detector;

at least one edge, between a dark area and a light area which is viewed by the at least one detector, which at least one edge moves, in relation to the at least one detector, as the object moves in the given direction; and computing circuitry which receives signals from the plurality of detectors and determines the given position responsive to the signal produced by the at least one detector at the given position, based on the gray level values and from signals produced only at that position.

In a preferred embodiment of the invention, the computing circuitry utilizes signals produced by only a portion of the detectors in the determination of the position.

Alternatively or additionally, the edges are formed in two groups of parallel edges wherein the first group of edges are regularly spaced from each other in the direction of motion and the second group of edges are regularly spaced from each other in the direction of motion and wherein the edges of the first and second groups are not regularly spaced from each other.

Alternatively or additionally, the light detector is sensitive to light of a given wavelength or wavelengths and wherein the position is determined to an greater accuracy than the diffraction limit of the light.

There is additionally provided for, in accordance with a preferred embodiment of the invention, apparatus for measurement of motion in two directions comprising:

apparatus according to any of the preceding claims for measurement of motion in one of the directions; and apparatus according to any of the preceding claims for measurement of motion in the other of the two directions.

There is also provided for in accordance with a preferred embodiment of the invention, apparatus for measurement of position in two directions comprising:

an array of detectors having a plurality of detectors each of which produces a signal at a given position in response to light reaching the detector;

a first edge, between a dark area and a light area and having a first orientation, viewed by at least one of the plurality of detectors;

a second edge, between a dark area and a light area and having a second orientation, viewed by at least one of the plurality of detectors; and computing circuitry which receives signals from the at least two detectors viewing the first and second edges and determines the position of the edge in the two directions, responsive to the received signals. Preferably, the array is a linear array. Alternatively, the array is a matrix array.

There is also provided in accordance with another preferred embodiment of the invention, apparatus for determination of position in two directions comprising:

a first edge between a bright area and a dark area, the edge being oriented in a first direction;

a second edge between a bright area and a dark area, the edge being oriented in a second direction and overlapping the first edge;

an array of detectors, each of which produces a signal in response to the light which it views, wherein the array views both the first and second edges; and computing circuitry which computes the position in both directions responsive to the signals produced by the detectors.

Preferably, the apparatus includes means for selectively activating the edges such that when the first edge is activated the position in one direction is computed and when the other edge is activated the position in another direction is activated.

Alternatively, the dark areas associated with the first and second edges have a different color and the array of detectors includes at least one detector which responds selectively to one of the different colors.

There is therefore provided in accordance with another preferred embodiment of the invention, scanning apparatus comprising:

a scanning bed having:
  at least two edges, each of said edges having a band of alternating dark and light strips running therealong; and
  an area suitable for accepting a document to be scanned between said bands; and
a scanning unit having a linear array of optical detectors, each said detector producing a signal in response to light received by the detector, the unit being operative to be moved along the scanning bed, such that a first plurality of detectors view the document and a second and a third plurality of detectors view the two bands respectively.

Preferably, the apparatus includes computing circuitry which computes the position and orientation of the scanning unit relative to the scanning bed, responsive to the signals produced by the detectors. Alternatively or additionally, each of said bands and the plurality of detectors viewing said bands are comprised in apparatus according to any of the above described embodiments.

There is also provided in accordance with a preferred embodiment of the invention, a method of calibrating a position measurement which utilizes signals from a plurality of detectors which view at least one edge comprising:

measuring the signals of the plurality of detectors at a plurality of positions; and calibrating the individual detectors based on averages of at least some of the measured signals.

The present invention will be more clearly understood from the following description of preferred embodiments of the invention in conjunction with the following drawings in which:

DESCRIPTION OF PREFERRED EMBODIMENTS OF THE INVENTION

Figure 1:
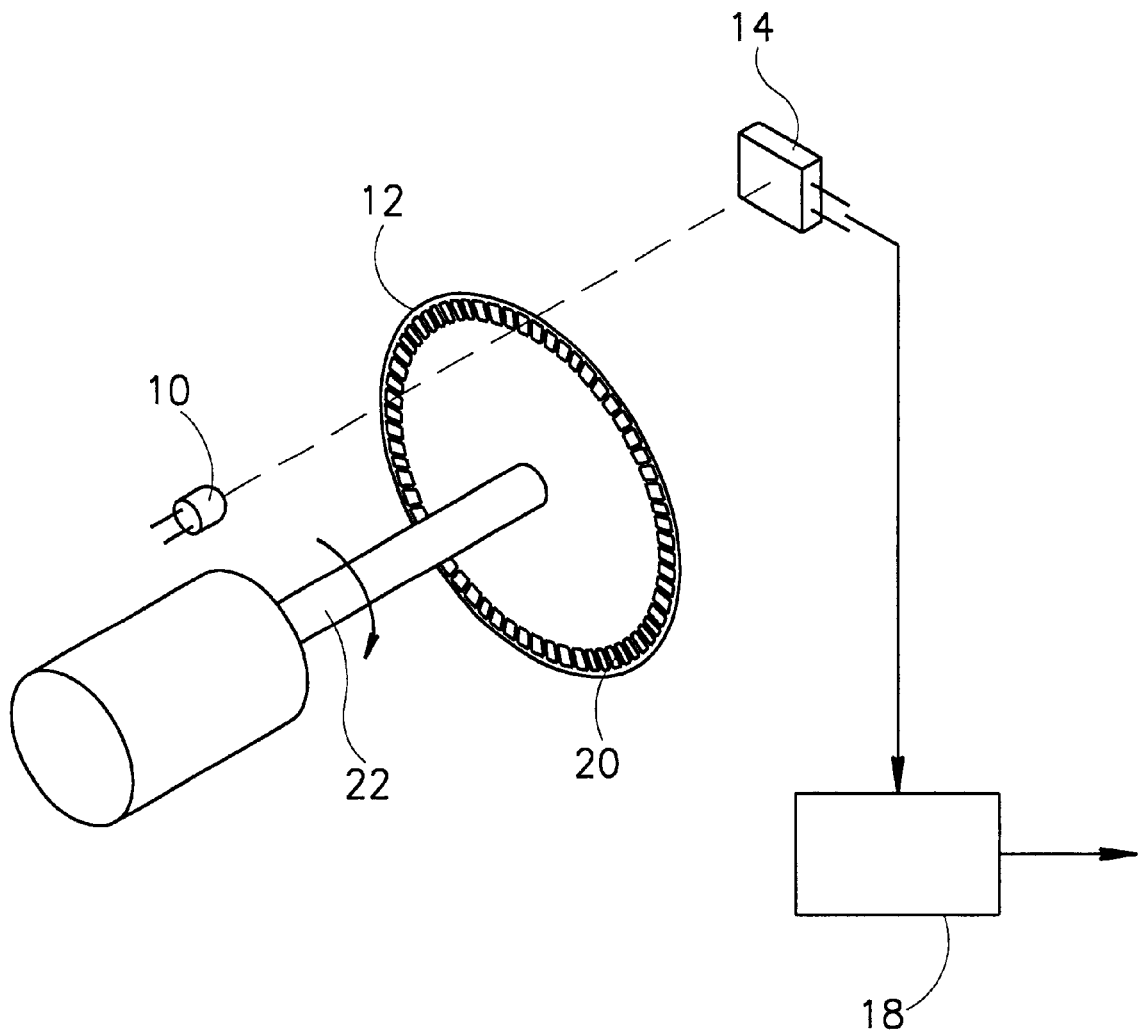
FIG. 1 is a schematic illustration of a prior art position determining apparatus.
Figure 2:
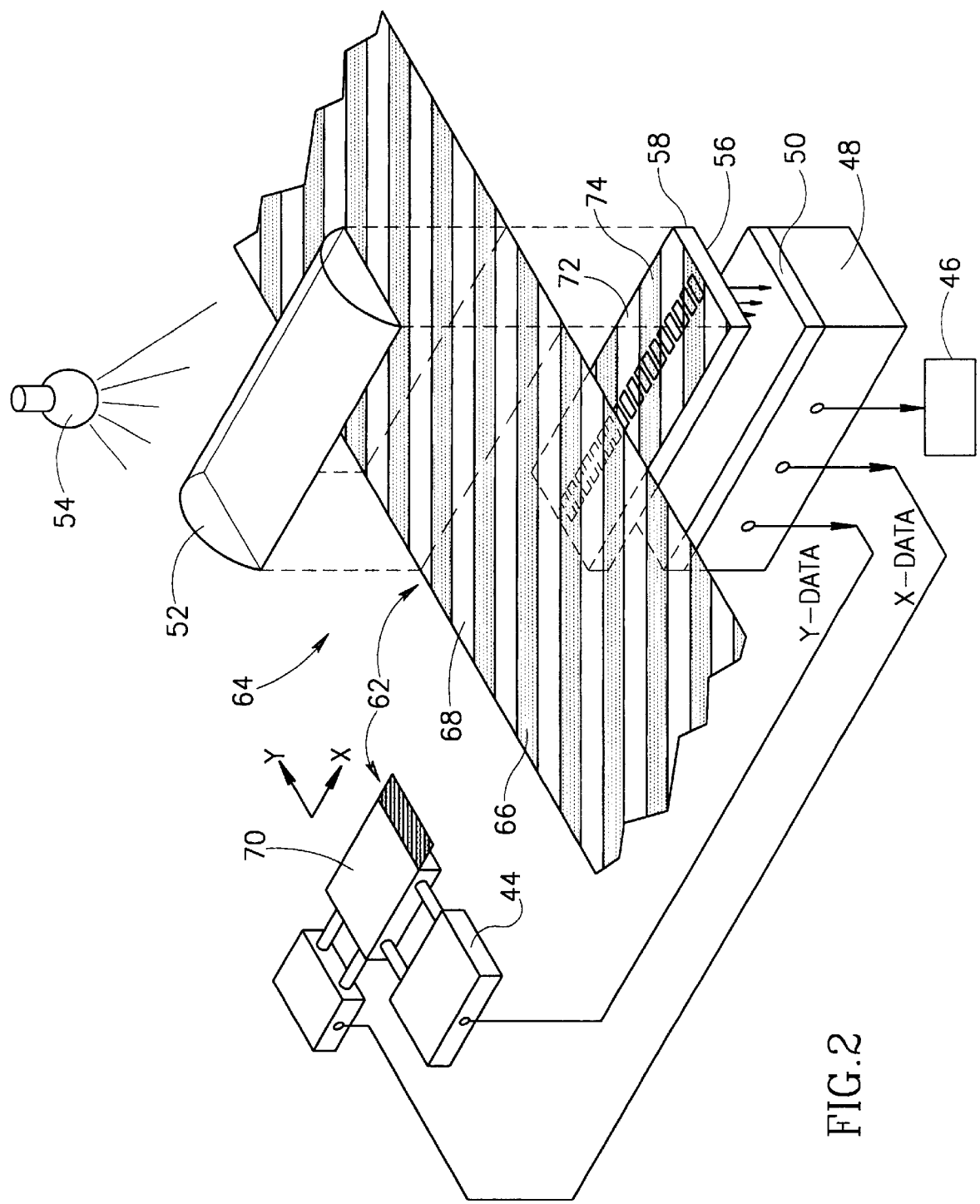
FIG. 2 is a schematic illustration of a very high precision position determining apparatus in accordance with a preferred embodiment of the present invention.

FIG. 2 illustrates an accurate position-determining apparatus 64 for determining the linear position of a movable object 70, in accordance with a preferred embodiment of the invention. Apparatus 64 utilizes a mask 62 which is mounted on object 70. The mask is comprised of parallel diagonal strips which are alternately transparent 68 and opaque 66 to light rays which originate in a lamp 54. The light rays are preferably collimated to the mask by means of a lens 52. Alternatively, a laser source can be used. The left portion of FIG. 2 shows moving object 70, having mask 62 mounted thereon. The right portion of FIG. 2 shows a greatly enlarged illustration of mask 62 together with additional apparatus associated with the mask not shown on the left portion of FIG. 2. A similar method of illustrating a complete apparatus is used in FIG. 8.

Light passing through the transparent strips in mask 62 illuminates the surface of a linear array 58 of spaced light detectors 56 (a linear array of CCD detectors for example) where it forms a pattern of diagonal alternately bright 72 and dark 74 strips on the linear array surface. Preferably light detector array 58 plane is held parallel to the plane of mask 62. The array of light detectors and the diagonal transparent and opaque strips on the mask are provided in a geometry assuring that the bright/dark edges of each strip pair preferably cross at least two light detector elements. In aggregate, a very large number of strip crossings are viewed by the detectors. The accurate determination of the position of object 70 position is based on the determination of the position of boundary lines between the bright and dark diagonal strips. The output signal from each light detector element is related to the fraction of the light detector area which is illuminated by a bright strip. The output signal from each light detector is converted to an electrical digital output in unit 50. The detected signal strength is preferably digitized and has a value depending on the fraction of each detectors light sensitive area which receives light from a bright strip.

A data processing unit 48 receives the light level measurement produced by each detector. From these detector output levels, the fraction of the area of each detector which receives light from a bright strip is determined, allowing determination of the location of each of the bright-dark strip edges 72 on the detector array and thus the position of object 70. Further improvement in the accuracy of the object position determination is obtained by averaging over all individual detector cell position determinations as described below.

Positional data from unit 48 is provided to a position readout device 46, and optionally to a position control device 44. While the above described measurement of linear position measures position in one direction, similar systems may be also used for measurements in two or three dimensions, as described, below.

The determination of the position of object 70 as derived from the determination of the bright-dark strip boundary location will now be described.

Figure 3:
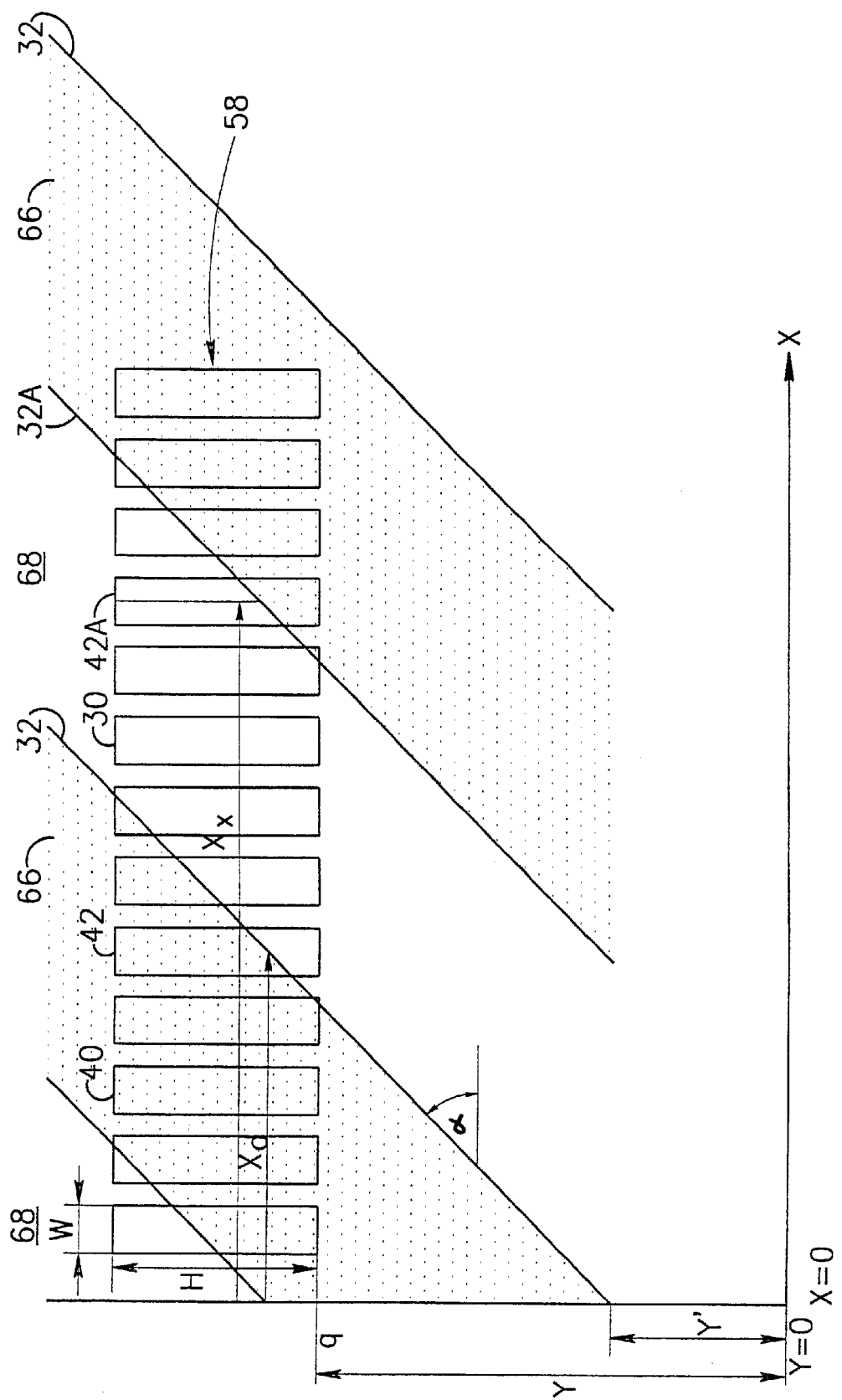
FIG. 3 is a schematic illustration showing dark strips and light strips of light on a linear array of detectors useful in accurately determining the position of a surface.

FIG. 3 is a schematic diagram showing the pattern of diagonal dark 66 and bright 68 strip areas as seen by the detector array 58. It should be noted that in the array 58 (typically hundreds or thousands of detectors), each detector surface is typically several tens of microns high (dimension H in FIG. 3), and 5 microns wide (dimension W in FIG. 3). As can be seen in FIG. 3 some detectors are completely covered by a bright strip, (such as detector 30), some are covered by a dark strip, (such as detector 40), and some are partially covered by a dark strip and partially covered by a bright strip such as detector cells 42 and 42A. It should be noted that for strips 42 and 42A, the edge crosses the long dimensions of the detector, while for other of the partially covered detectors one of the edges crosses a short dimension of the detector. In a preferred embodiment of the invention, only the outputs of detectors in which the two opposing sides are crossed by the edge (denoted as linear cells or detectors) are used in measuring position and the detectors for which the edge crosses one long and one short side are ignored.

In order to determine the position of diagonal edges 32 and 32A between dark strip 66 and bright strip 68 on light detector array 58 in FIG. 3, the amount of light detected by each "linear" cell is detected and recorded.

Using the value of the light level detected by linear cells and their x axis address, the position of the edge lines 32 and 32A is determined in accordance with a preferred embodiment of the invention. Additional details of the method for such edge line determination are shown in FIG. 4 and FIG. 5 and in the following description.

Figure 4:
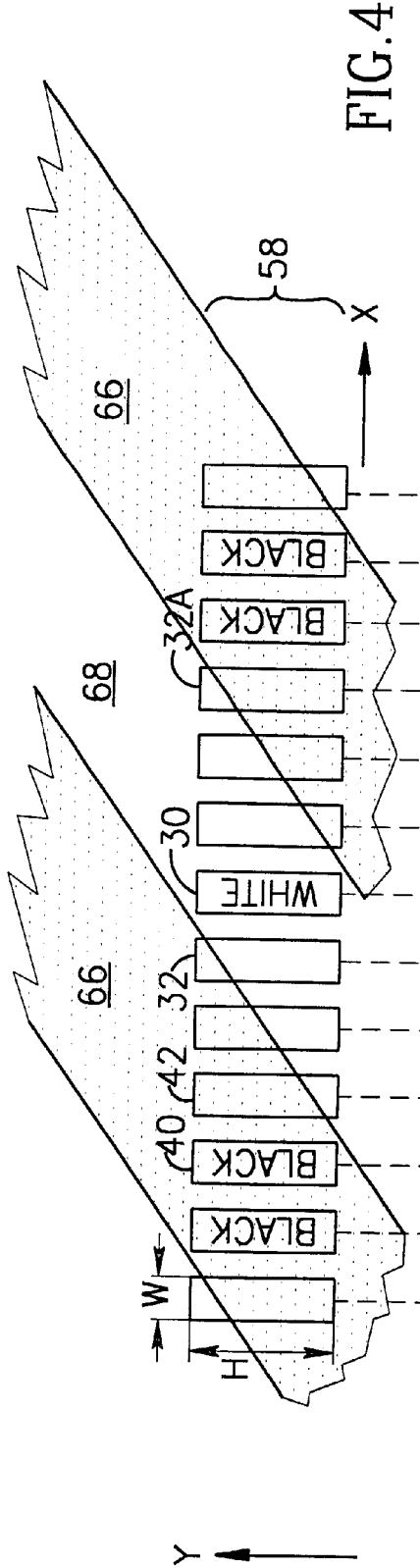
FIG. 4 is a schematic illustration of a linear array of detectors partially and fully covered by bright or dark strips of light received from the masks.
Figure 5:
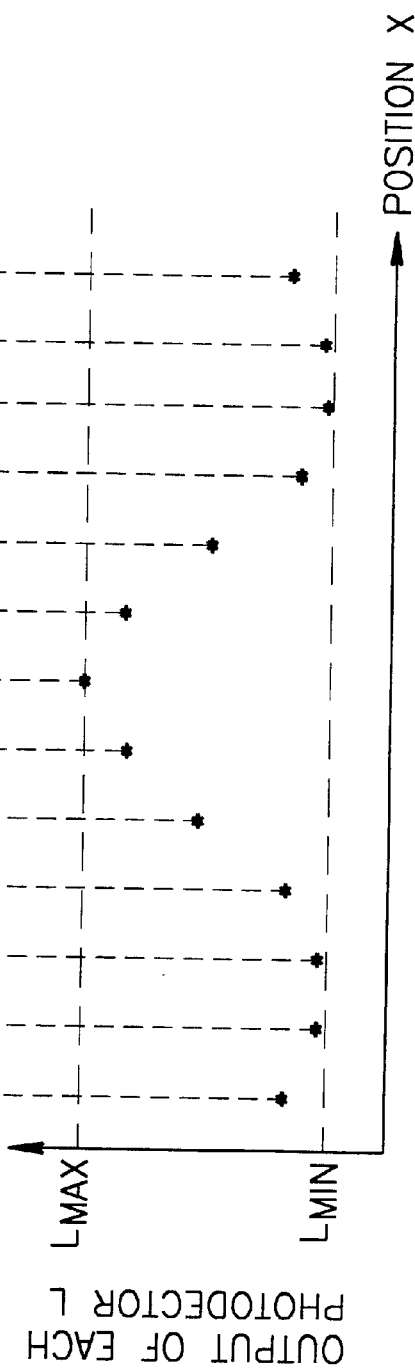
FIG. 5 shows the output levels of individual detector cells as shown in FIG. 4 as a function of their positions.

The amount of detected light for the detector cells shown in FIG. 4 is a function of their x position and is illustrated in FIG. 5. The output reading of each detector as shown in FIG. 5 is recorded in the data processor 48.

As may be noted from FIG. 5, a minimum light detection value $L_{min}$ is obtained for detector cells whose whole photosensitive area is under dark strips and a maximum value $L_{max}$ is obtained for detector cells wholly under bright strips; intermediate values $L_k$ is obtained for each detector cell k, where a fraction of the cell is under a bright strip and the rest of it is under a dark strip. From the value $L_k$ of detected light and from $L_{max}$ and $L_{min}$ the fraction $A_k(\epsilon_1 < A_k < (1-\epsilon_1))$ of the area of cell k which is under the bright strip is determined as:

$$A_k = \frac{L_k - L_{min}}{L_{max} - L_{min}}, \tag{1}$$

where $\epsilon_1$ is the fraction of the output when the edge crosses into and out of the linear region of the cell.

Referring to FIG. 3 we note that H is the height of the light detector cell; α is the angle between the bright-dark strip edge and x-axis.

To calculate the position of a bright-dark edge such as edge 32 in FIG. 3, which crosses the linear detector cell 42 or any other cell k (where dark is above white within the detector cell), the data processor 48 of FIG. 2 solves the equation yielding the Y position (see FIG. 3)

$$H \cdot A_k = Y - (Y_{edge} + \gamma X_k) \text{ (dark above bright)} \tag{2}$$

where $A_k$ is the fractional k detector cell area coverage by the bright strip, Y is the distance of the bottom q, of the detector cells from Y=0, $Y_{edge}$ is the Y position of the dark-bright edge (such as 32) at x=0 and $X_k$ is the x distance of the center of cell k from x=0 and γ=tanα (where α is the angle of the diagonal strips in respect to the x-axis).

Using the same definitions but for the dark above bright edge lines such as for line 32a, Y:

$$H \cdot (1 - A_k) = Y - (Y'_{edge} + \gamma X_{k'}) \text{ (bright above dark)} \tag{2'}$$

Referring to FIG. 3 the positions $X_k$ and $X_{k'}$ of the individual detector cells from a reference X=0 are known, α is known. $A_k$ and $A_{k'}$ is calculated as described above, so that Y is determined for each linear cell from equations 2 and 2' by the data processing unit 48 of FIG. 2.

Each linear light detector provides a strip edge line determination which provides Y positional determination of the object position. Averaging over all such detector position determinations for all linear k-type detectors, leads to a more accurate object position <Y> which is given by $$<Y> = \frac{\sum_k Y_{edge(k)}}{\sum_k 1} + \frac{\gamma \sum_k X_k}{\sum_k 1} + \frac{H \cdot \sum_k A_k}{\sum_k 1} \quad (3)$$

Similarly averaging over all k'-type linear detectors of strip edge positions where the bright strip are above the dark strip we obtain $$<Y> = \frac{\sum_{k'} Y'_{edge(k')}}{\sum_{k'} 1} + \frac{\gamma \sum_{k'} X_{k'}}{\sum_{k'} 1} + \frac{H \cdot \sum_{k'} (1 - A_{k'})}{\sum_{k'} 1} \quad (3')$$

The final object position determination is based on averaging over all positional determinations from Equations 3 and 3', leading to a positional accuracy of better than 0.01 micrometers. The positional data obtained using Equations 2 and 3 is typically object displacement data relative to a bright-dark edge of a pair of adjacent strips. Determination of the absolute object position requires knowledge of which strip the positional data refers to. This invention provides the following methods and means to obtain the absolute position:

a) employment of a separate lower accuracy Y measurement which provides positional accuracy to within one dark-bright strip pair, or b) employment of, another set of wider strips on the same mask to measure Y approximately; or c) employment of a special coded sequences of wider dark and bright strips, providing directly the required rough positional data.

A positional determination accuracy of ±0.5 micrometers is provided by each cell detector (in accordance to Equation 2 or Equation 2') in this embodiment of the invention by use of an 8-bit output from commercially available light detectors with 40 micrometers long cells in the direction of positional determination. By averaging the data of individual cell position determinations using a line array detector (having 1800 "linear" cells of similar size) a positional determination accuracy of ±0.01 micrometers is achieved. The accuracy improves by $1/\sqrt{N}$ where N is the number of linear detector cells employed. The use of a standard, simple 10 mm×10 mm CCD type 2-dimensional matrix for positional determination leads to a position determination accuracy of better than ±0.002 micrometers (ideally ±0.0004 micrometers).

In various embodiments of the invention, the object whose position or displacement is to be measured, may be attached either to the detector or the strips. Furthermore, either the detectors are held stationary and the strip moves or vice versa.

As an alternative to the use of lenses to transfer the light to the detector, other methods of optical transfer, such as fiber-optic cables may be used to transfer light from the mask to the detector. Each fiber should then conduct light into a single detector and the dimensions of the fiber then become, essentially, the dimensions of the detector for the purposes of the measurement. It should be understood, that since the fibers are generally round, an adjustment in the way the position is measured must be made.

In the aforementioned measurement method and embodiment of this invention, the position determination of the object location or displacement is improved further by use of auto correction and compensation of errors as described below.

The sensitivities of the many light detectors in the detector array vary and so do the light levels of the many bright and dark strips. The individual light-detectors dimensions and placement relative to each other may vary from the specified values, and may differ from one another. By comparing the positional data obtained from each detector cell with the more accurate positional data obtained after initial data averaging (by means of the data processing unit, for example), a compensating input appropriate for each cell may be provided into the memory and data processing unit. Temperature changes also effect the positional determination accuracy. Suitable compensation for temperature changes is also preferably provided, for example by changing the distances measured in proportion to the expected changes in dimension of the mask.

The effects of vibration can be reduced by averaging positional measurements over a period of time, larger than a single period of vibration, preferably equal to a multiple of the period or equal to many periods. An accurate time averaged positional determination can then be provided which is not affected by an instantaneous measurement.

The design and fabrication methods of masks which provide alternately bright and dark strips of light across the light detecting surface, when used in accordance to the various embodiments of this invention, are also separate embodiments of the invention. The preferred angle of the bright-dark strips provided by the mask and the strip widths which lead to optimal positional determination, are important parts of various embodiments of this invention.

In order to enable calibration and positional determination by the apparatus, as described herein, each bright strip must completely cover at least one light-detecting element and each dark strip must cover at least another detector element.

Figure 6:
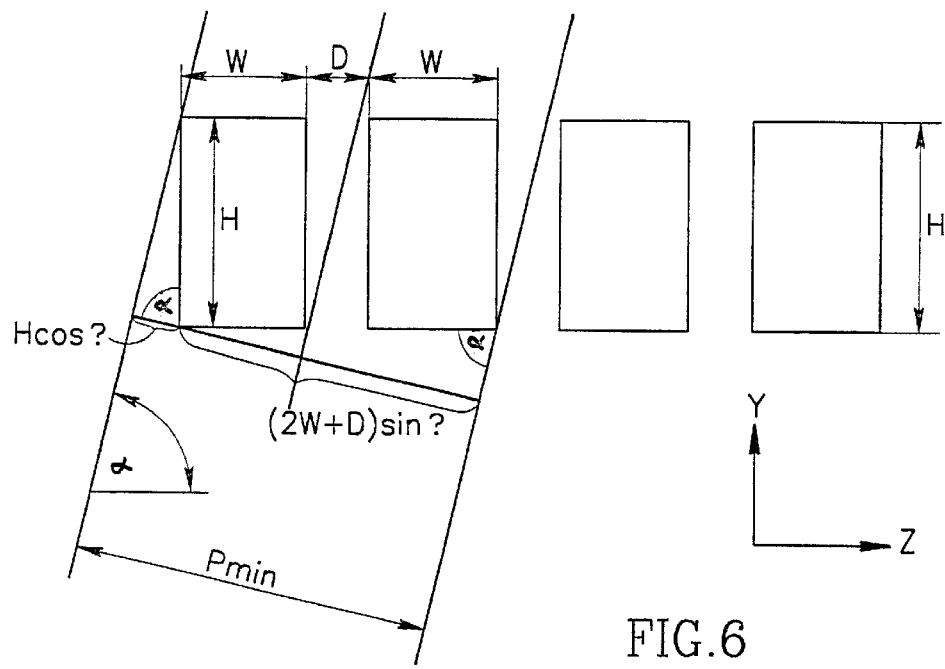
FIG. 6 illustrates the minimal strip width $P_{min}$ of a bright and dark strip pair, providing for one cell wholly covered by a bright strip and one cell wholly covered by a dark strip, in preferred embodiments of the invention.

The minimum width $P_{min}$ of each bright-dark strip pair received on the light detector array surface must therefore be, in accordance with FIG. 6:

$$P_{min} = H \cos \alpha + (2w + D) \sin \alpha \quad (4)$$

where $\alpha$ is the angle of the strip with respect to the x-direction (which direction is perpendicular to the long dimension of the mask), H, W and D are the dimensions of the detecting cells light sensitive areas and their spacing, as shown in FIG. 6.

Figure 7:
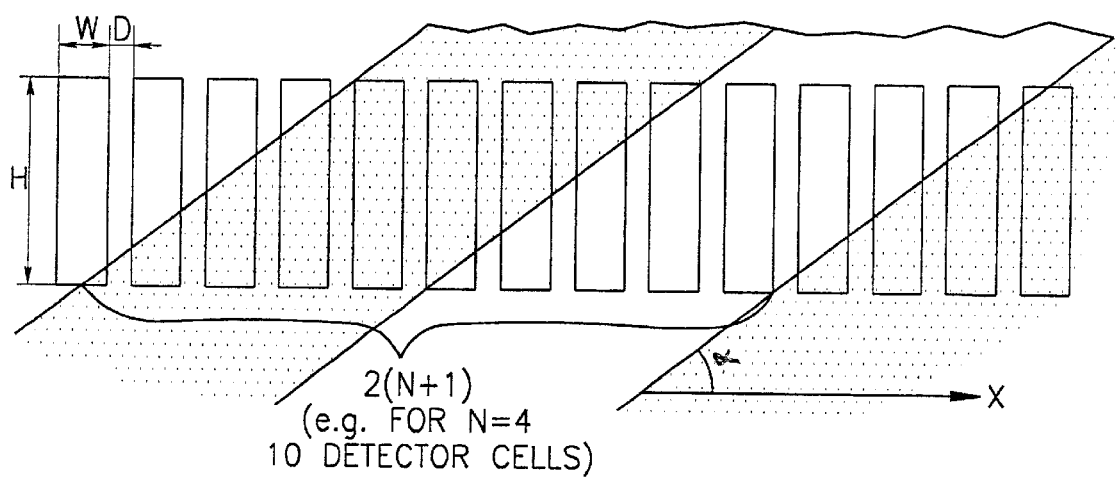
FIG. 7 illustrates bright and dark strips on a linear array of detectors at an optimum strip angle $\alpha_{opt}$ so as to provide a maximum number of linear cells.

An increased positional accuracy is achieved by the apparatus if a mask as described in the various embodiments of the invention, causes alternate bright and dark diagonal strips to illuminate the detectors at an optimal angle $\alpha_{opt}$ as shown in FIG. 7, on the light detecting array. This optimal angle $\alpha_{opt}$ is determined by:

$$\tan(\alpha_{opt}) = H/[n(D+W) - W] \quad (5)$$

In Eq. (5), n is an integer number of value 3 or greater and H, D and W are determined from the detector array dimensions (FIG. 7 illustrates the case of n=4). Use of such an optimum strip angle across the detector array surface provides for a maximum number of "linear" detector elements in each bright and dark strip cycle.

In order to determine the fractional coverage of detector cells in accordance with Equation 1, at least one detector cell must be completely covered by each bright strip and one cell must be completely covered by each-dark strip. This requirement coupled with the use of an optimal angle $\alpha_{opt}$ of the strips leads to the use of at least 2(n+1) detector cells for each bright-dark strip pair. In each such a group of 2(n−1) detectors, at least one detector cell is wholly covered by a bright strip, at least one detector cell is wholly covered by a dark strip, at least (n−1) linear detector cells are partially covered by a bright strip above the dark strip, at least (n−1) linear detector cells partially covered by a dark strip above a bright strip and a maximum of 2 detectors are "nonlinear". The definition of "linear" detector was given above; a nonlinear detector is a detector in which the dark-bright edge crosses one long and one short side of a detector cell.

The mask is provided with two points P(a) and P(b). Using the apparatus described above at the position P(a) whose absolute positions on the mask are accurately determined using independent accurate measurement near the start of the mask, a positional reading R(a) is entered into the memory unit. The point P(b) known precisely and located near the mask end, is measured and the reading is recorded as R(b). The true position P(p) of any point "p" is now provided via a linear transformation from the previous, recorded data and from a positional reading R(p):

$$P(p)=P(a)+K[R(p)-R(a)] \quad (6)$$

where K is determined from the knowledge of the true position of "a" and "b" and from the measured positional reading of "a" and "b":

$$K=[P(a)-P(b)]/[R(a)-R(b)] \quad (6a)$$

Equations (6) and (6a) give a method of finding the position of any point between a and b with a good accuracy.

The above method can be used to give an absolute accuracy of position to the extent that points P(a) and P(b) are accurately known. However, if two such points can be identified and their position determined or known to a less than absolute accuracy, then the above equations can be used to determine position relative to the two points with a relative accuracy proportional to the accuracy with which the positions of P(a) and P(b) are known. The repeatability of the present method is however, not affected by inaccuracies in knowledge of the positions of P(a) and P(b).

Methods and means may be provided for the calibration of the position-determining apparatus and for the automatic compensation of errors, such as are due to optical, mechanical, electronic or thermal variation or inaccuracies inherent in the apparatus, thus enhancing the accuracy of positional determination. These methods and means are of two types. First an Auto-correlation or Auto-calibration method performed by the instrument itself that ensures resolution and repeatability within the desired accuracy and second external calibration by which measurements utilizing the instrument are made and compared to a reference at a number of points.

The sources of inaccuracies in the instrument measurements are due either to random errors, or to systematic errors from variations in the properties and geometry of the detectors and the scale. The random errors' contribution is made small by averaging many independent estimates (each linear detector contributes a value). The systematic errors are corrected for by the Auto Correction, that calculates correction-factors to compensate for the above-mentioned variations, by comparing systematic deviation between position-predictions of a particular detector versus the average from all the detectors.

External calibration is performed using common methods, such as by mounting both the instrument and a known, absolutely-calibrated, reference device on the same platform. Then, the platform is moved and at each position both the instrument and the reference readings are taken down. This is repeated at a few points along the direction of motions, preferably every few mm.

Auto-correlation of the position-determining apparatus is provided by the following procedure, assuming the configuration of FIGS. 2–5 and motion in the Y direction, so that all the detectors have the same Y, and each has a different X:

Stage A: Collect Data

Move the system in small, otherwise arbitrary, steps, for example steps of 0.1 mm. At each step, record the reading of all the detectors. The actual position need not be known very accurately. Detectors are designated by the index "k," positions are designated by the index "p" and each reading is of strip "s" or of edge "es."

Stage B: Calibrate the Relative Sensitivity and Dark Current of Each Detector

For each detector k, collect all the readings for which the detector k was completely over a white (bright) strip. This situation can be determined from the fact that these readings correspond to a maximum reading relative to neighboring readings. Average and record the readings to get a value $W_k$ for each detector.

Collect and average all the readings for each detector k for which the detector was completely over a black or dark strip. Average and record these values to get a value $B_k$ for each detector.

Calculate the average value of $(W_k-B_k)$, and designate it as "WB". The average is over all the detectors.

It should be noted that, in general, for reflective strips, the strips are specular reflectors. Furthermore, the system is operated far from diffraction limits and the strips are far enough apart so that diffraction effects are negligible.

Stage C: Normalize to Remove the Detectors' Sensitivity Variations

Transform the recorded readings of stage A into "Detector-Corrected" values (DCV) according to the formula:

$$DCV(p,k)=(\text{reading}(p,k)-B_k)*WB/(W_k-B_k). \quad (7)$$

All DCV values should fall between 0 and 1, except for random errors and (b) variations in the light levels or in the brightness or darkness of the strips. These variations are corrected for in the next stage.

Stage D: Normalize to Correct for Light Intensity Variations

Each reading of detector k, in stage C, is either a maximum (white), minimum (black) or intermediate (potentially can be used for measurement). All of the intermediate values are normalized to provide a "Normalized Coverage" value (NCV) according to the formula:

$$NCV(p,k)=[DCV(p,k)-DCV(p,k_B)]/[DCV(p,k_W)-DCV(p,k_B)], \quad (8)$$

where $k_B$ and $k_W$ are the indexes of the nearest black and white detectors.

Stage E: Calculate First Order Position from Intermediate Values

Using equation (2) above:

$$H*A_k=(Y_{edge}+\gamma*X_k)-Y, \quad (9)$$

where $X_k$ is the horizontal coordinate of the center of detector k, Y is the vertical coordinate of the bottom of this detector (and all the other detectors). $Y_{edge}$ is the vertical coordinate of the particular transition-edge that cuts this detector (it's Y position at X=0).

Assume that all the strips have the same width and all are perfectly parallel. y=tan(α) is known. $Y_{edge}$ is the strip number multiplied by DY, the width/cos(α) and X(k) is the (inner) detector spacing multiplied by k. In other words:

$$Y_{edge}(s_k) = s_k * DY, \quad (10)$$

where $S_k$ is the index of the strip under detector k;

$$X(k) = k * DX, \quad (11)$$

where k is the index of the detector.

Each intermediate value detector gives an estimate (computed value) of Y. All of the results from each of the detectors having an intermediate value, taken at a given position p should be the same, that is all the values:

$$Y(p,k) = -H * NCV(p,k) + Y_{edge}(s_k) + \gamma * X(k), \quad (12)$$

should be the same for all k for a given p. In a real system, Y(p,k) will not be the same for all k for any given p.

A more accurate measure of the position is the average of all Y(p,k), namely, Y(p). Y(p) for each position p is determined by averaging all of the values of Y(p,k) for which the detector is in the linear region. One can assure that only such values are used by averaging only values of NCV between 0.1 and 0.9 or an other appropriate value (with the understanding that the values have been normalized to 1 in the previous stages).

One can also compute an error for each of the individual values of Y(p,k) as:

$$Err(p,k) = Y(p,k) - Y(p) \quad (13)$$

The actual computations in this stage are:
  a. Calculate the position-estimates Y(p,k) for each of the detectors k and each position p (only for detectors that are in the linear region).
  b. Obtain a better Y(p) position value by averaging Y(p,k) over all k.
  c. calculate the individual errors Err(p,k).

Stage F: Correct for Consistent Variations in Err(p,k) to Correct for Detector Dimensions and Center Position:

If a particular detector has a different height (H) from the other detectors or its bottom Y differs from the other detectors or it is horizontally displaced from its ideal position, then Y(p,k) will have a consistent difference from Y(p), in addition to relatively "random" variations about the consistent difference. To correct for these variations calculate the average position offset for detector k, namely, DY(k) and use this to correct each position calculation. In particular, the average dimensional offset, DH(k) of detector k is:

$$DH(k) = \frac{\sum_p [Err(p,k) - Q(k)] * NCV(p,k)}{\sum_p NCV^2(p,k)}, \quad (14)$$

wherein Q(k) is initially equal to DY(k).

G: Correct Positions for Non-uniformity of the Strips

The above calculations assume that the strips are all the same size. In practice there is a variation in strip width. This can be corrected for using the following method:

Collect all the Err(p,k) and arrange them in accordance with the strip to which they refer. If a particular strip has a different width, or is not parallel to the others or is offset from the others, Err(p,k) will show a consistent deviation Err(s).

The line offsets and angle offsets are calculated as follows:
Calculate:

$$TY(s) = \text{sum of } Err(pk) \text{ for } s; \quad (15)$$

$$TG(s) = \text{sum of } Err(p,k) * X_k \text{ for } s; \quad (16)$$

$$TX(s) = \text{sum of } X(k) \text{ for } s; \quad (17)$$

$$T1 = \text{number of terms summed.} \quad (18)$$

Compute the width and angle errors for each strip "s" as:

$$DYS(s) = <Err> = TY/T1 \quad (19)$$

$$D\gamma(s) = <Err*X>/<X> = TG/TX \quad (20)$$

H. Second Order Position Correction (a) The position correction of stage E is now replaced by the more accurate formula:

$$Y(p,k) = -H(k) * NCV(p,k) + Y_{edge}(s_k) + YS(s_k) + \gamma(s_k) * X(k) + Q(k) \quad (21)$$

where:
Q(k)=DY(k)  H(k)=H+DH(k)
Y(s)=DYS(s)  γ(s)=γ+Dγ(s)

(b) Repeat stages F and G to get new corrections DH(k), DY(k), Dy($s_k$), DYS(s)

(c) Improve the accuracy of Q(k), H(k), γ(s) and YS(s) by applying:

$$Q(k) = Q(k)_{old} + DY(k) \quad (22)$$

$$H(k) = H(k)_{old} + DH(k) \quad (23)$$

$$\gamma(s) = \gamma(s)_{old} + D\gamma(s) \quad (24)$$

$$YS(s) = YS(s)_{old} + DYS(s) \quad (25)$$

(d) Repeat (a), (b), (c) (and/or stages E, F, G) until DH(k), DY(k), Dγ($s_k$) and DYS(s) are negligible.

I. Removal of Points With Large Errors (a) Calculate the standard deviation of Err(p,k), for each linear detector k.

(b) Calculate the average of the standard deviations over all the detectors.

(c) Ignore those detectors which have a standard deviation greater than some value. For example, if the rejection criteria is $\sigma^2(k) > 10 * \sigma^2$ then only 0.2% of the detectors will be removed, for random distribution of the errors. A lesser or greater limit can be used giving greater or lesser chance of removing bad detectors and a less or greater chance of removing good detectors, respectively.

(d) Remove bad measurements. For example, remove those measurement points having Err(p,k) having the largest 5% of Err(p,k). This will reduce $\sigma^2$ by a small and generally negligible amount, generally less than 20% and have a negligible effect on all the corrections. A value other than 5% can be used.

(e) Recalculate Q(k), H(k), γ(s), YS(s) using data without the bad detectors and bad measurement points.

The auto correction information is applied to the data during measurement by the following methodology:

(a) Take readings of the detectors k.

(b) Translate each reading into a corrected reading:

$$DCV(k) = -(\text{reading}(k) - B_k) * BW/(W(k) - B_k). \quad (26)$$

(c) Determine the black and white maxima and minima of the readings.

Convert each intermediate reading into normalized readings NCV using:

$$NCV(k)=(DCV(k)-DCV(k_B))/(DCV(k_W)-DCV(k_B)), \quad (27)$$

where $k_B$ is the closest black and $k_W$ is the closest white detector, k.

(d) Calculate Yk as follows:

$$Y_{edge}(s_k)=S_k \cdot DX, \quad (28)$$

where $s_k$ is the index of strip s, under detector k $$X(k)=k*DX, \quad (29)$$

where k is the detector number $$Yk=-H(k)*NCV(k)+Y_{edge}(s_k)+YS(s_k)+\gamma(s_k)*X(k)+Q(k). \quad (30)$$

(e) Calculate Y by averaging Yk over all the detectors which are in the linear range. The bad detectors may be excluded from the average.

While, in preferred embodiments of the invention all of the stages of the auto-correction are preferably performed, in other embodiments of the invention only some of the corrections may be performed.

Temperature changes affect the mask strip dimensions and the output of the individual light detectors in the detector array; this may lead to inaccuracy in position determination. The apparatus described in this invention preferably provides appropriate software compensation for temperature changes in its memory and data processing unit to provide accurate positional determination throughout the operational temperature range. Alternatively, the temperature of the elements of the apparatus is controlled.

Special care is preferably taken in mask preparation to assure that the diagonal strip edges are straight and parallel to each other and that their widths and angle correspond to the desired pattern.

Figure 8:
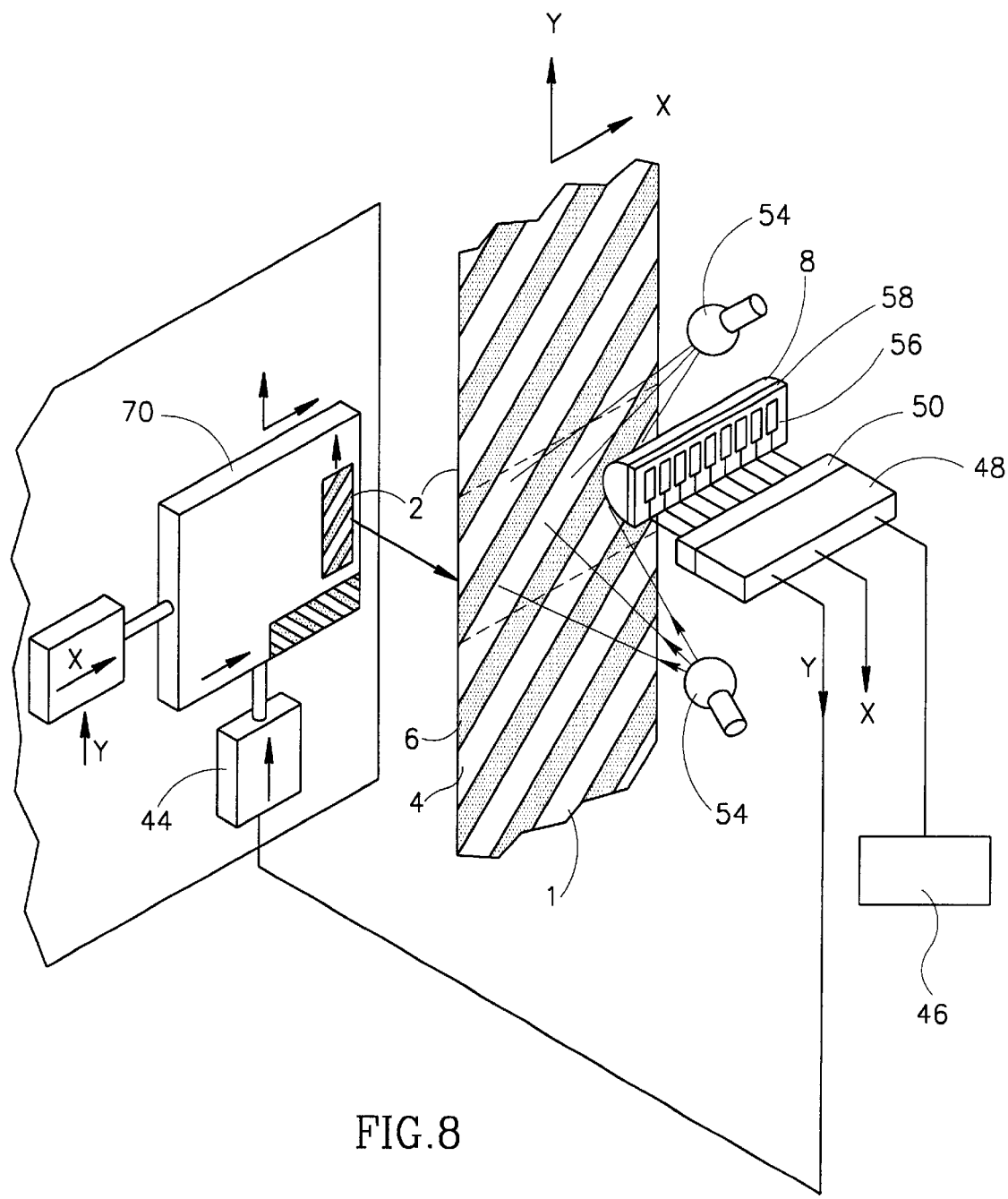
FIG. 8 is a schematic illustration of a preferred embodiment of the invention using a reflective mask.

Another preferred embodiment of the present invention described hereunder and illustrated in FIG. 8 employs a light reflecting mask 2, moving with the object 70 whose position is to be determined with very great accuracy. Mask 2 has alternating light reflective (white) 4 and light absorbing (black) 6, diagonal strips on its surface is situated as shown in FIG. 8. When light from a lamp 54, situated opposite the reflective mask 2, is directed toward the light reflecting strips, the white and black strips on the surface of the mask reflect that light flux in differing proportions. A dark and bright light strip pattern reflected from mask 2 is collimated by a cylindrical lens 8, and is imaged unto an array surface 58, which contains an array of light detectors 56. The output of each detector cell 56, is converted into a multilevel digital output in unit 50, and is fed to a memory and data processing unit 48, so as to accurately determine the position of the object, preferably using calibration, autocorrection and temperature compensation methods and means similar to those described in the previous embodiment of this invention. The positional data is preferably recorded and displayed by unit 46 and/or used for object position control via unit 44. In the preferred embodiment of the invention either the object with its attached mask may be displaced in object position determinations while the detector array is held fixed or the object may be held stationary and the light detecting array may be attached to a moving object.

Figure 9:
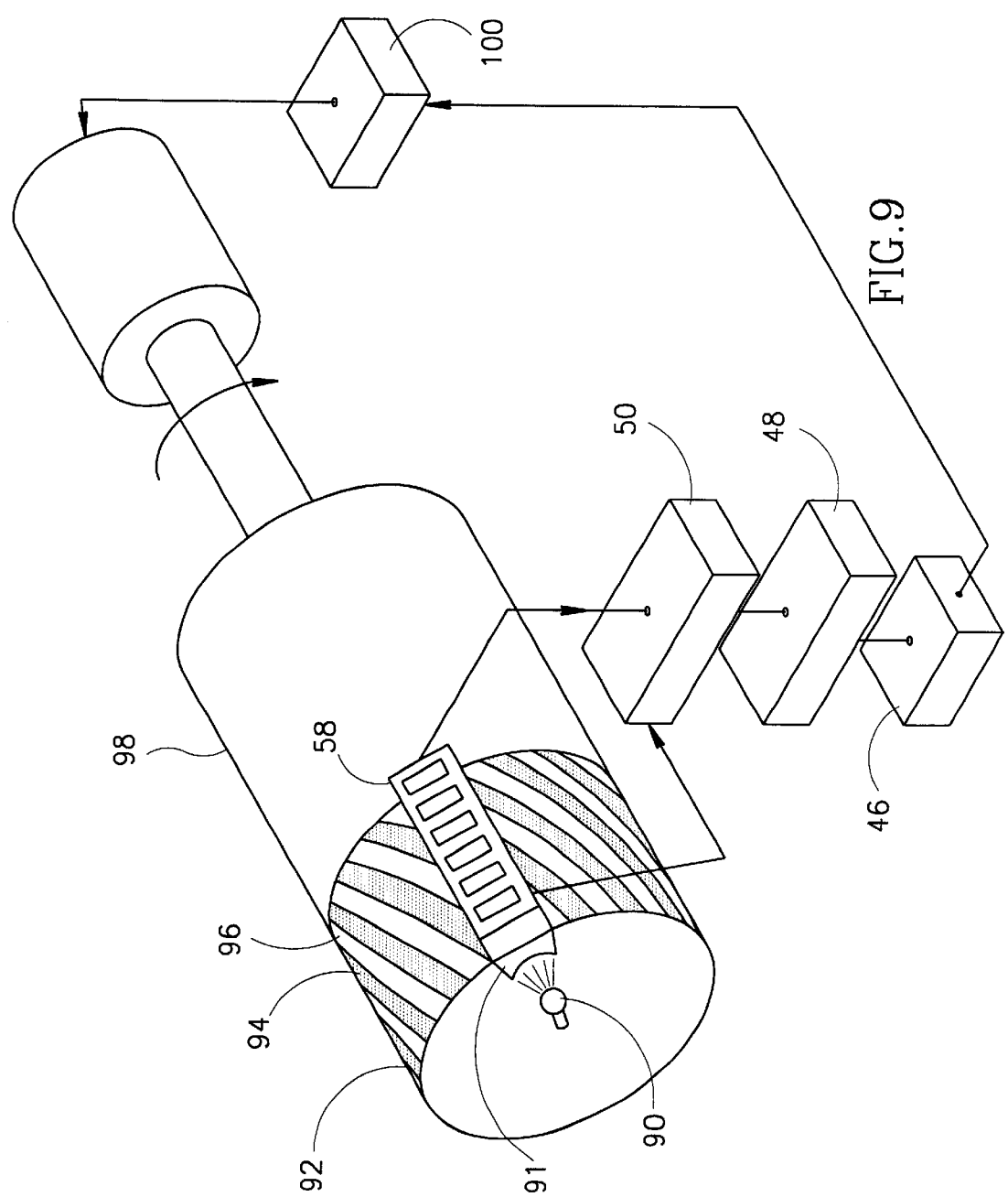
FIG. 9 is a schematic illustration of a preferred embodiment of the invention suitable for the precise determination of angular position and displacement.

FIG. 9 shows a position sensing apparatus for the accurate determination of the angular position of an object in accordance to a preferred embodiment of the invention. In accordance with this embodiment of the invention, the apparatus includes a mask, having alternately transparent and opaque diagonal strips. The mask is coaxial and moves with the angularly displaceable object. FIG. 9 illustrates an embodiment in which the detector array 58 is outside of the rotating cylinder 98. Radiation from a source 90, inside of the rotating cylinder 98, illuminates the light transparent 96, and light opaque 94, diagonal strips of cylindrical mask 92. The radiation transmitted through the mask is collimated by a suitable cylindrically symmetrical lens 91, onto the surface of detector array 58. The outputs from each detector element are preferably digitized in unit 50, and in unit 48, are processed for angular position determination. The output of data processor 48, is preferably provided either to an angular position display and recording instrument 46, or to an angular position determining device 100, (such as a stepping motor or other control device), or to both simultaneously. It may also be provided to other devices requiring angular information on the object.

In this embodiment the light source and the lens are inside the rotating cylinder, while the detector array is outside. It is, however, possible to have the radiation source outside of the rotating cylinder and the lens and the radiation detecting array inside of the rotating cylinder. In both such embodiments the cylinder and the object may be held stationary and the light detecting array may be attached to a cylindrically moving platform.

In other preferred embodiments of the invention, a reflecting/absorbing type stripped mask is mounted coaxial with the object. Light is directed to and reflected from the mask strips. It is collimated unto a light detecting array and the techniques and methods employed in accurate positional determination are similar to those employed in the embodiments shown in FIGS. 2, 8, and 9. The reflecting mask may be mounted either on the inside or on the outside of the cylinder and the preferred component arrangement in each case is clear from the description.

If the mask with its diagonally patterned reflecting mask is located on the inside of a cylinder, the illuminating lamp, the ray correcting lens and the detector array are also located on the inside of the cylinder. In many cases this arrangement is not practical and it is preferred to provide the reflecting mask and the other components on the outside of the cylinder. In either embodiment the cylinder with its mask can be the moving part or the detector array and its imaging lens could be the moving parts, in which case the cylinder with the mask on it is stationary.

Figure 10:
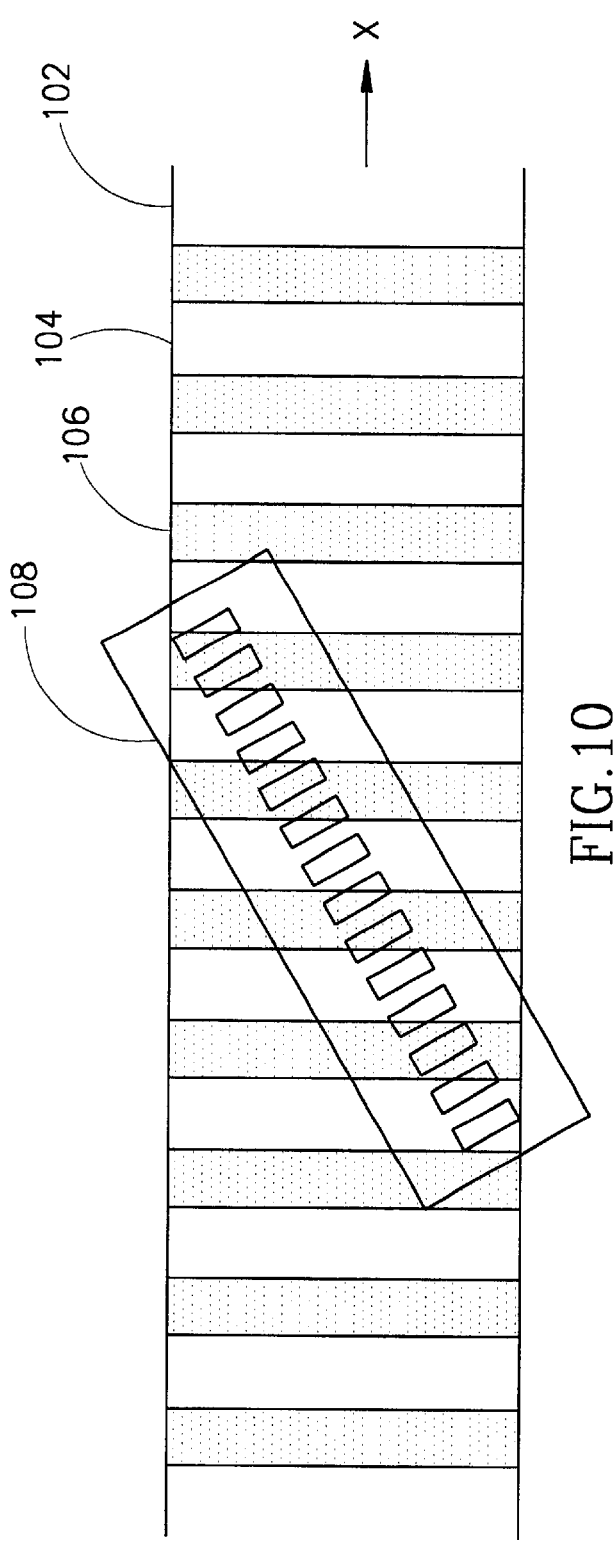
FIG. 10 illustrates an arrangement in accordance with a preferred embodiment of the invention in which dark and bright strips are perpendicular to the long mask (measurement) direction and a detector array is placed at an angle in respect to the strips.

FIG. 10 illustrates a different arrangement of strips and detectors in accordance with a preferred embodiment of the invention, including a mask 102 having parallel strips 104, 106 which are perpendicular to the long mask dimension and to the direction of motion and which utilizes a radiation detection array 108 which is inclined at an angle to the direction of motion. Either a transparent or a reflective mask can be used for this arrangement as well. Another variation of the embodiment of FIG. 10 is to provide the detectors as shown in FIG. 10, but to angle the strips as well.

Figure 11:
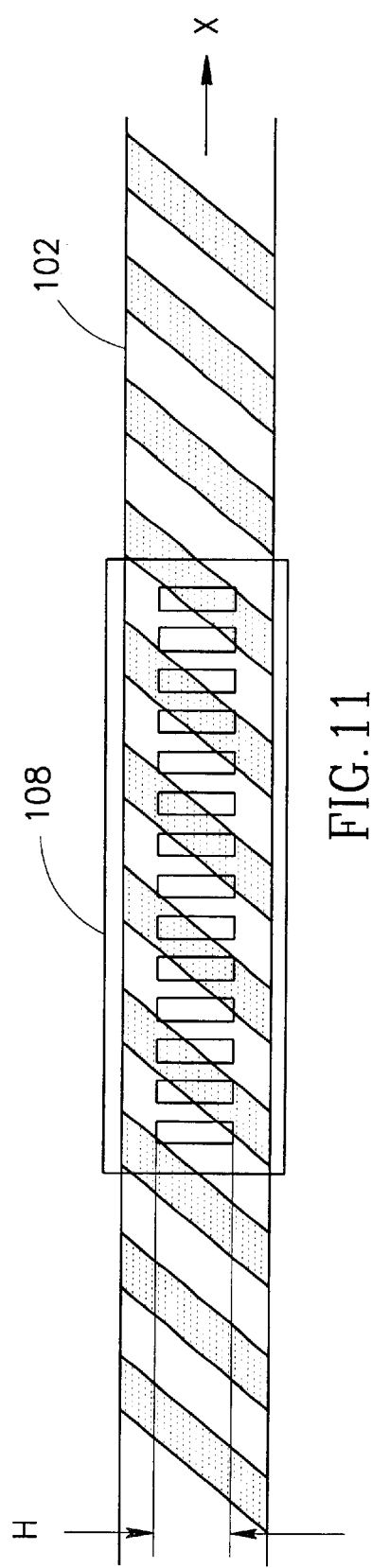
FIG. 11 illustrates of a very narrow mask with a linear detector array aligned along the long mask direction in accordance with a preferred embodiment of the invention.

A preferred embodiment of the invention which permits the use of a very narrow mask (of less than 0.1 mm wide) is illustrated in FIG. 11. In this embodiment the required width of the mask is only slightly greater than the height H of the light detectors. In this embodiment, detector array 108 is mounted along the long mask direction which is also the direction of linear displacement. Typically the very narrow dark and bright strips are only slightly inclined with respect to the line perpendicular to the longitudinal direction of the mask, and only two "linear" detectors are located in each bright-dark strip pair.

The positional accuracy determination for this embodiment is therefore lower than for the previously described embodiments, but use of a very narrow mask may be of advantage in many cases. Either a transparent or a reflective mask type can be used in this embodiment as well.

Figure 12:
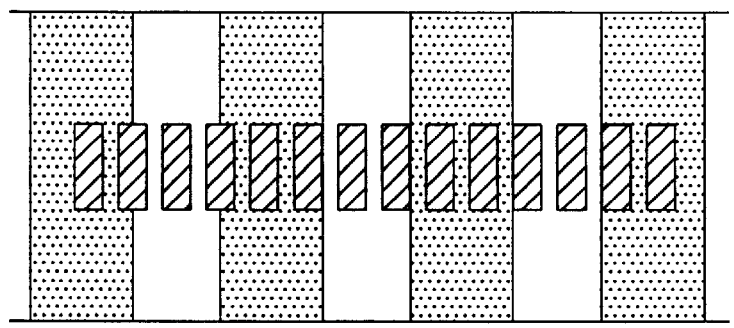
FIG. 12 illustrates another embodiment of the invention in which vertical strips are used together with a linear array of detectors oriented in the direction of motion.
Figure 13A:
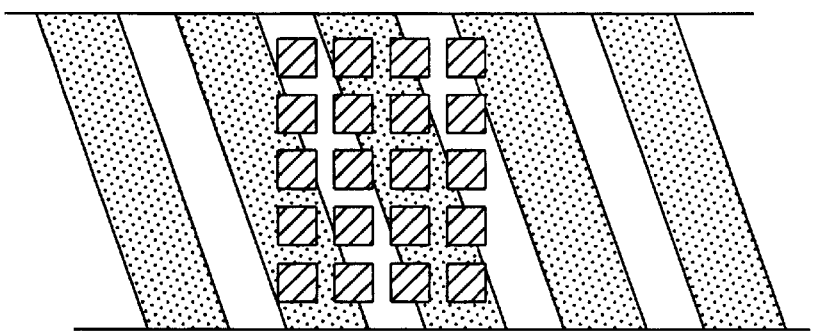
FIGS. 13A–13D show the use of a two dimensional matrix of detector elements used in place of the linear array of the embodiments of FIGS. 1–12, in accordance with preferred embodiments of the invention.
Figure 13B:
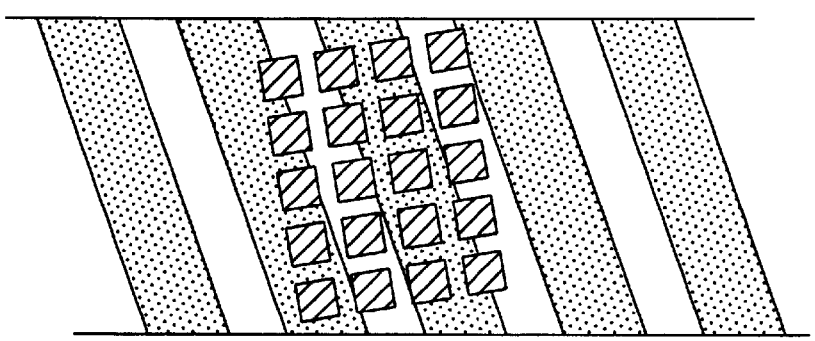
Figure 13C:
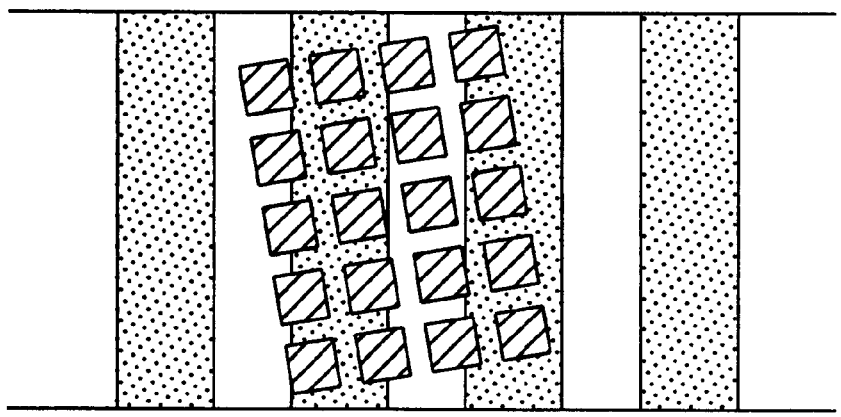
Figure 13D:
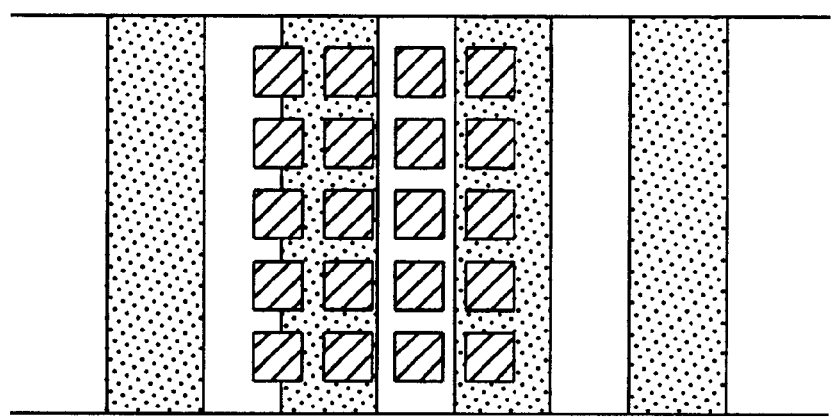

FIG. 12 illustrates yet another embodiment of the invention in which vertical strips are used together with a linear array of detectors oriented in the direction of motion. In this embodiment, neither the strips nor the detector elements are inclined with respect to the direction of motion. It should be noted that the elements are either in the black region, in the white region or in a linear region (which is now defined somewhat differently from the definition given above). There is no region which is non-linear as in the above described embodiments.

In other preferred embodiments of this invention the positional determination is carried out by providing a two dimensional matrix type detector (such as used for example in CCD cameras, or in high quality optical data processing equipment). Since the number of detectors in a matrix type detector is several hundred times greater than that of a line detector, averaging over all detector positional readings in the data processor typically improves the positional determination by a further factor of 20. In the various embodiments of this invention as described above such a matrix array may be provided, instead of the linear array. Linear position determining apparatus such as illustrated in FIGS. 2 and 8 and apparatus which determines the position of angularly displaced objects such as illustrated in FIG. 9 may alternatively be provided with matrix type detectors to improve their position determining accuracy.

FIGS. 13A–13D shows the use of a two dimensional matrix of detector elements used in place of the linear array of the above described embodiments.

Figure 14A:
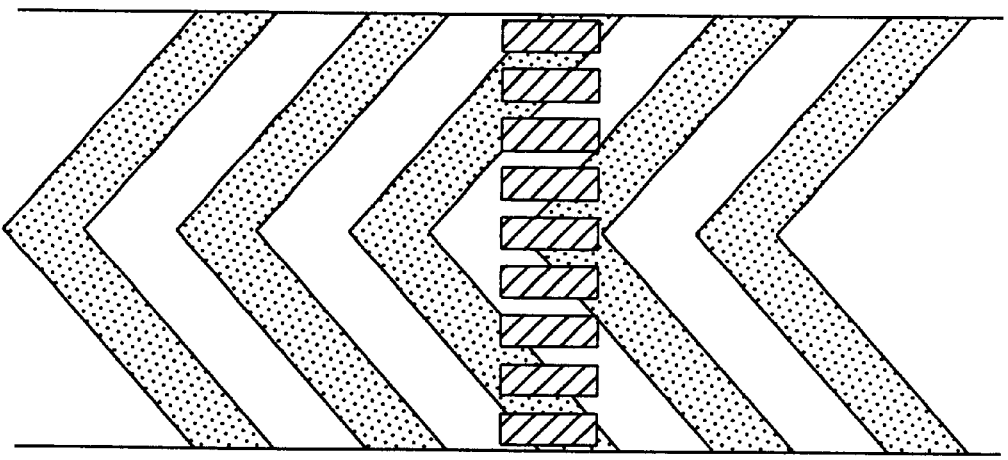
FIGS. 14A and 14B illustrates configurations in which a limited degree of motion is measured in a direction perpendicular to the main direction of measurement, in accordance with preferred embodiments of the invention.
Figure 14B:
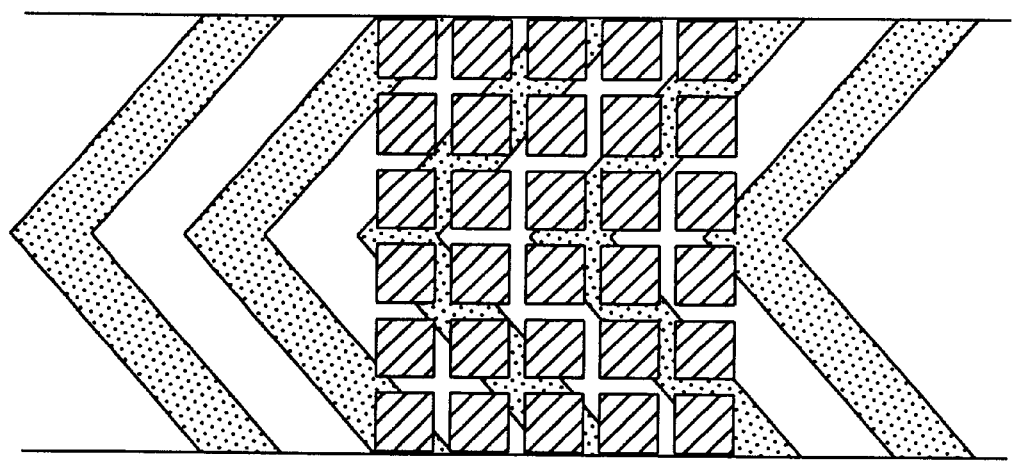

FIGS. 14A and 14B illustrate configurations in which motion is measured in the direction of the arrow with very limited variations of motion being measurable in the direction perpendicular to the direction of motion. The variations in the various amplitudes of the detectors are analyzed to determine the direction of motion and the amplitude in each direction. This embodiment is preferred when the moving object may have some small, but not negligible, motions perpendicular to the main direction of motion. Alternatively, one may use two detectors, each situated above a mask with strips at different directions.

Figure 15A:
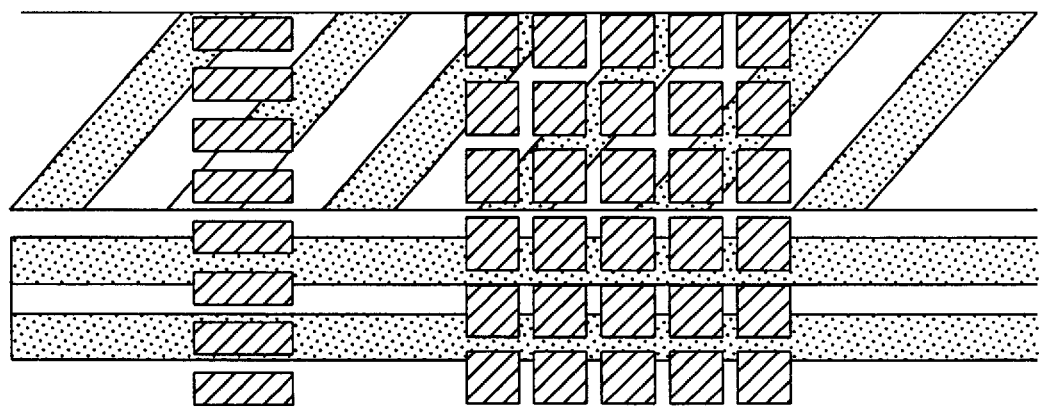
FIGS. 15A and 15B illustrate the use of alignment strips to assist in alignment of the detectors and strips, in accordance with preferred embodiments of the invention.
Figure 15B:
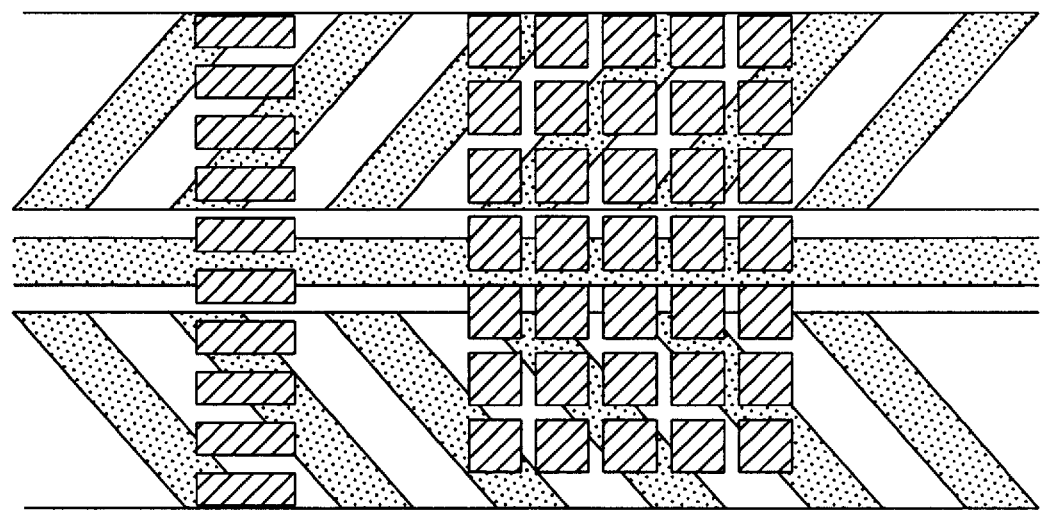

FIGS. 15A and 15B illustrate scales utilizing strips running in the direction of motion. These strips can be used in alignment of the system since the readings of detectors which view these strips (black, white or intermediate) do not change with motion. If a matrix of detector elements is used, alignment is especially simple since the alignment can be verified without moving the scale, since measurements are taken by the matrix at various positions in the direction of motion. While both one and two dimensional arrays are shown for illustration, in practice only one of the two is used.

Figure 16A:
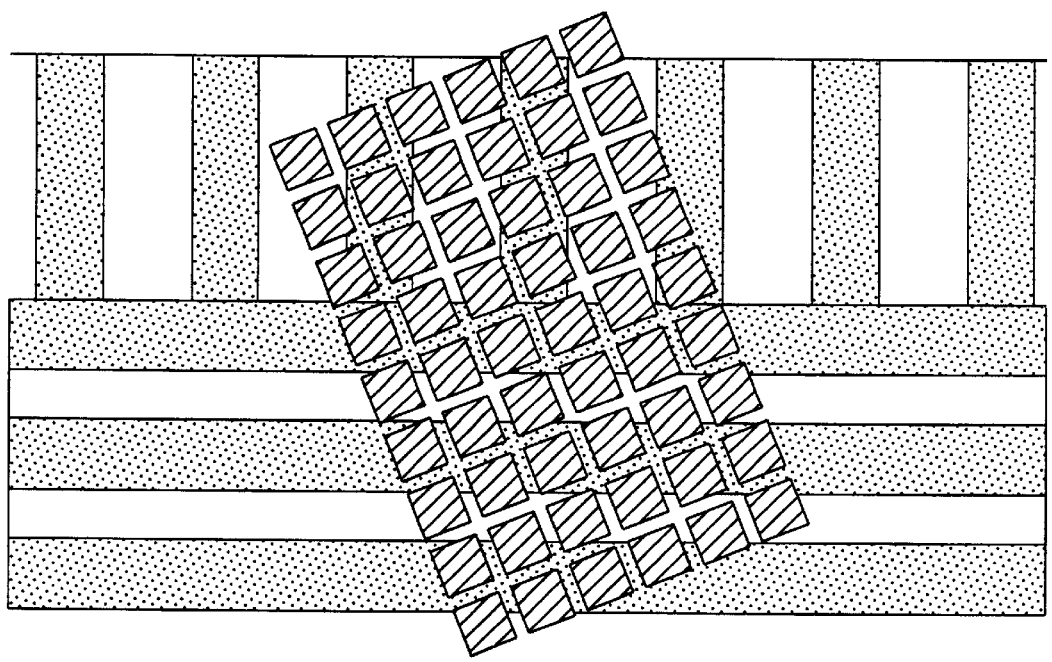
FIGS. 16A and 16B illustrate other strip configurations which allow for limited measurement of position in a direction perpendicular to the primary direction of motion, in accordance with preferred embodiments of the invention.
Figure 16B:
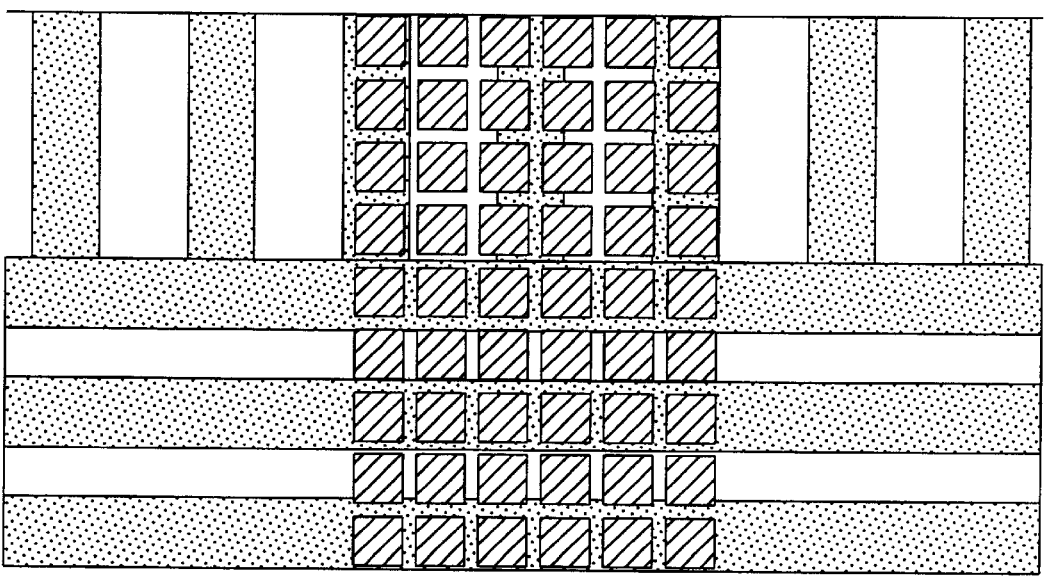

FIGS. 16A and 16B illustrate other strip configurations which allow for limited measurement of motion in the direction perpendicular to the primary direction. In FIG. 16A the matrix and the strips are not aligned and in FIG. 16B, the strips and the matrix are approximately aligned.

Figure 18:
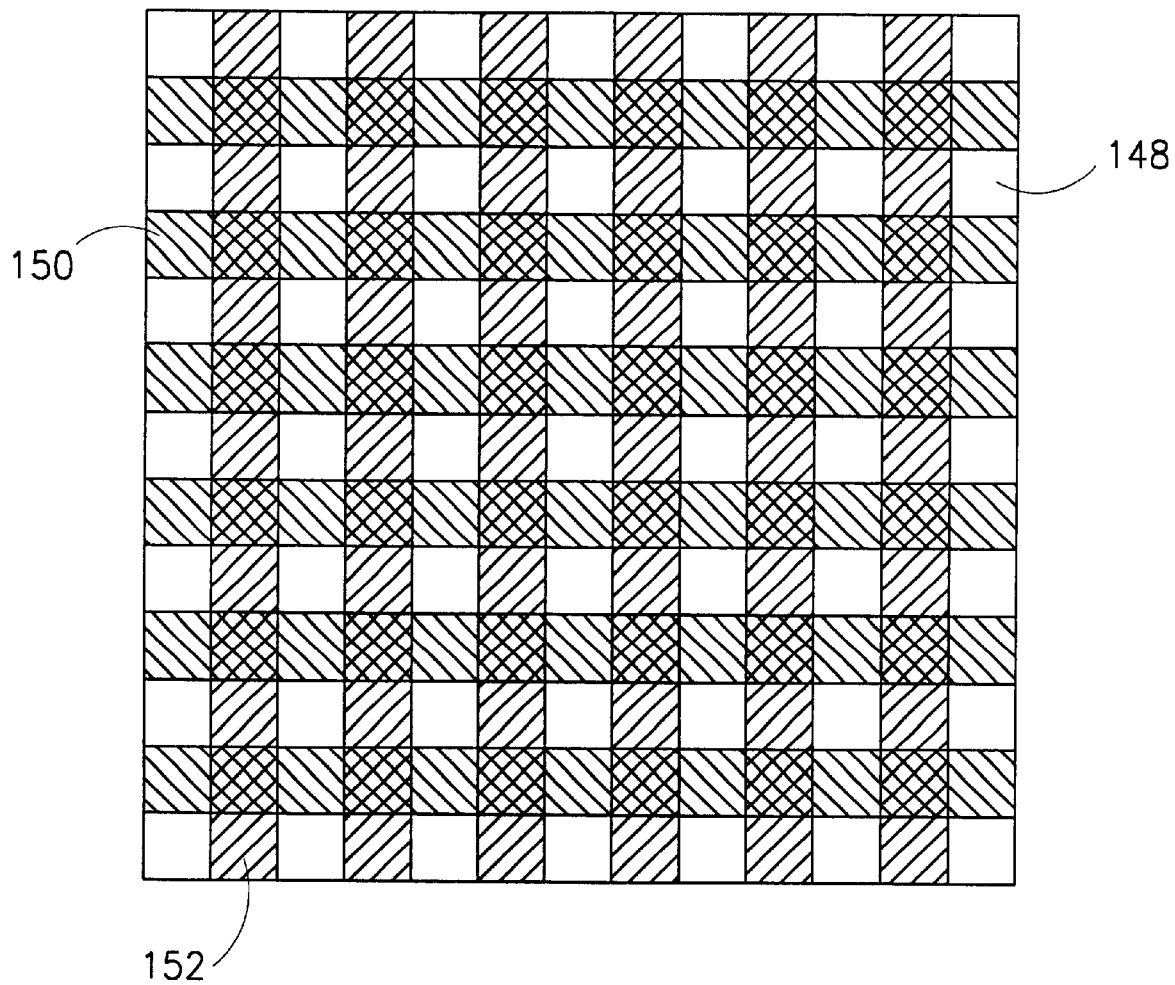
FIG. 18 illustrates a mask system which utilizes LED strips and which is capable of measurement of motion in two directions.

In an alternative embodiment of the invention, as shown in FIG. 18, an LCD 148 is used to form the scale. To measure in both the X and Y directions, the plate is formed with superimposed strips in the X direction (150) and the Y direction (152). When measurement in the X-direction is desired, the Y directed strips are activated; when measurement in the Y-direction is desired, the X-directed strips are activated.

Alternatively, the strips can be color coded, such that one (say the x directed set) is red and the other is colored blue. The array detector is replaced by a color sensitive array (such as a color CCD camera.

In either case, the array may be aligned with the strips or may be at an angle to the strips.

Preferably, the background between the strips is gray and not white as in the scales described above. Furthermore, the strips are formed by a very fine pattern of color dots. Where two colors overlap, there is a small change in the density of the dots to compensate for the other color. The background and the dot density is chosen such that the colored lines have a constant intensity as perceived by their respective detectors, and where the background (which also consists of the other color) is uniform.

In another preferred embodiment of the invention, the transmission or reflection type masks are manufactured on a base material having a thermal expansion coefficient which is equal to that of the detector array. This reduces and eliminates inaccuracy due to temperature variations. Accuracy of the strip pattern geometry is obtained, for example, by reduction of a large scale drawing to the desired mask size or by methods of photolithography.

Figure 17:
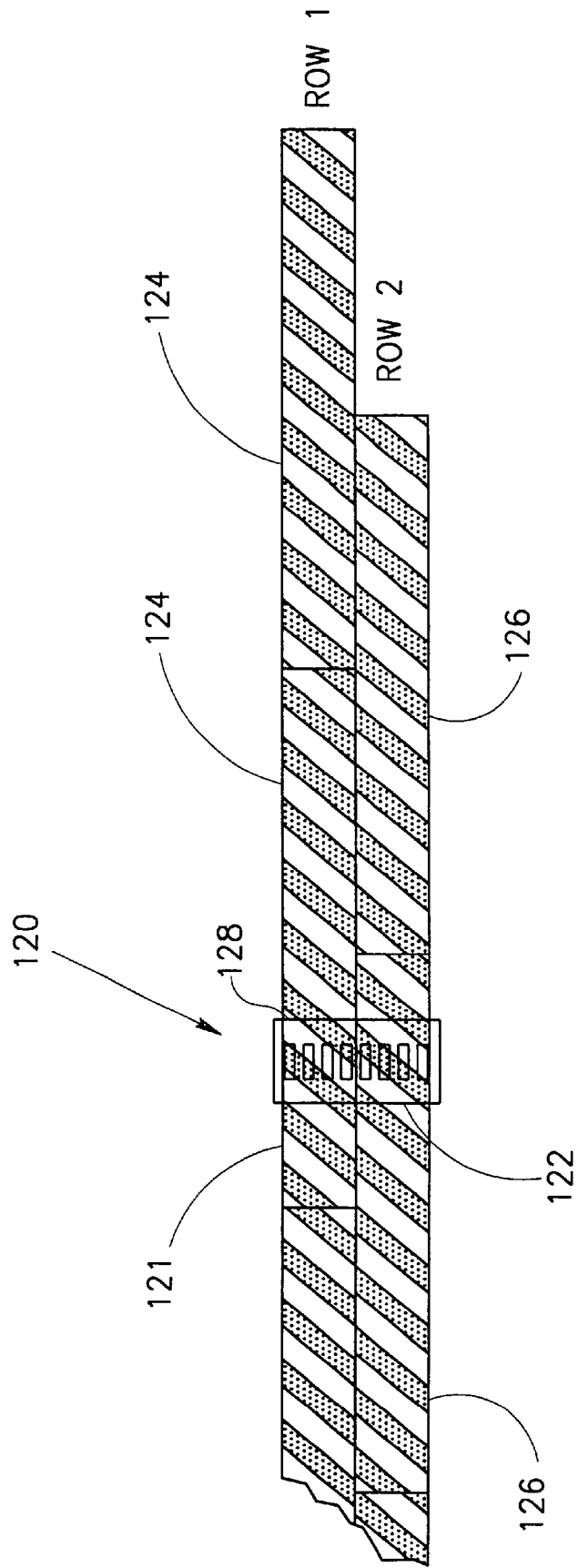
FIG. 17 illustrates a long mask produced from several staggered standard masks in accordance with a preferred embodiment of the invention. The tiled arrangement of the two rows of the mask assure that continuous positional data is provided.

To obtain a long mask length it is often necessary to connect several shorter masks sections 124, 126. A preferred method of producing such a long mask as shown in FIG. 17 is to fabricate the mask out of two rows of tiled mask pieces. An array detector 120 is split into a pair of array detectors 122, 128; one partial array detects the radiation from one row 121 and the other partial array detects the radiation from a second row. Because of the tiled arrangement at least one of the partial array detectors always detects 'unbroken' strip edges since the juncture of mask pieces in one row (producing 'broken' strip edges) occurs in the middle of the mask piece in the second row where strip lines are continuous. Normally the readings from both rows are averaged, except close to a transition where the data from the "broken" strip is disregarded.

When the array is oriented parallel to the direction of motion (motion in the Y direction and the array is aligned in the Y direction) or in a manner different from that of FIGS. 2–6, the auto-calibration system and its application are changed somewhat, in the following manner:

Stages A–F are executed as above, except that equation (12) above is replaced by:

$$Y(p,k) = -WH*NCV(p,k) + Y_{edge}(s_k) + Y0(k), \qquad (31)$$

where WH is the individual detector width and Y0(k)=k*DX.

In stage G only DYS(s) is calculated and in stage H equation (21) is replaced by:

$$Y(p,k) = -WH(k)*NCV(p,k) + Y_{edge}(s_k) + YD(s_k) + Y0(k) + Q(k), \qquad (32)$$

where WH(k)=WH+DH(k) ad the other terms have the same meaning as for Eq. 21.

In stage I the criteria for bad detectors is unchanged. The criteria for bad spots is changed to the following:

Take all the Err(p,k) and arrange them by strip (or rather by strip edge). The same edge is equivalent to the same position on the scale, since a motion by one DX would put detector #n+1 at the spot on scale, previously occupied by detector #n. A bad spot on the edge will probably influence all the readings that use this particular edge. The errors Err(p,k) are grouped together by the edges s, each group belonging to an unique edge s, having its own σ.

Calculate $\sigma^2(s) = <Err(p,k)^2>$ at each position relative to the strip edge.

Compare $\sigma^2(s)$ to $\sigma^2$. A spot is bad only if $\sigma^2(s)>10*\sigma^2$ (or some other suitable limit).

Repeat new stage H with bad spots and bad detectors removed.

The auto correction information is applied to the data during measurement by the following methodology:

Utilize the same methodology as with the angled detectors except replace Eqs. 28–30 by:

$$Y_{edge}(k)=s_k*DY \quad (33)$$

$$Y0(k)=k*DX \quad (34)$$

$$Y(k)=-WH(k)*NCV(k)+Y_{edge}(s_k)-YS(s_k)+Y0(k)-Q(k) \quad (35)$$

When the array is oriented at some angle to the direction of motion (motion in the Y direction), the auto-calibration system and its application are changed somewhat, in the following manner:

In stage H, Eq. 21 is replaced by a more general equation, the choice of equation depending on the mutual alignments of the array and the strips.

If the array-detector is aligned approximately in the X-direction, strip-edges cutting through the long side of the detectors, then $$Y(p,k)=\text{Constant}-H(k)*NVC(p,k)*(\gamma(s_k)*\sin(\delta)+\cos(\delta))++ \\ k*DX*(\gamma(s_k)*\cos(\delta)-\sin(\delta))+Y_{edge}(s_k)+YS(s_k)+Q(k)$$

where $\delta$ is the angle that the array makes with the x-axis, $\delta\sim0°$.

If the array-detector is aligned approximately in the Y-direction, strip-edges cutting through the short side of the detectors, then ($\delta\sim90°$)

$$Y(p,k)=\text{Constant}+(k*DX-WH(k)*NCV(p,k))*(\sin(\delta)- \\ \gamma(s_k)*\cos(\delta))++Y_{edge}\{s_k\}+YS(s_k)+Q(k) \quad (36')$$

When more than one scale is used, autocalibrate each of the scales separately. For each position where both scales give a reading, calculate the average position for scale 1 and scale 2 respectively and denote them as Y1(p) and Y2(p).

Calculate transformation constants from scale 1 to scale 2 as Y1=A*Y2+B, where:

$$B=B1-B2, A=A1/A2$$

and $$B1=<Y1(p)>, B2=<Y2(p)>, A12=<(Y1(p)-B1)^2>, A22=<(Y2(p)-B2)^2>$$

Another implementation of the autocalibration methodology utilizes an Olympic Average method in which whenever a set of values is to be averaged, the upper 10% and lower 10% of the values are discarded and only the middle 80% of the values is used.

It is understood that in an ideal situation the edges should be parallel, equally spaced (or having precisely known spacings), straight and sharp.

The auto-correction corrects for small variations in edge position and angle (parallelism). Where the same potion of the edge is used by all the detectors, the edge need not be perfectly straight, in other cases, curvature of the lines is a part of the errors in construction which are corrected by averaging a large number of detectors.

When matrix detectors are used, it is possible to relax the straightness requirement since the curvature can be measured by making measurements at each level on the strip.

Small amounts of blurring may be dealt with by reducing the extent of the linear region such that the entire blurred area is within the true linear region.

It is sometimes advantageous to provide substantial blurring or defocusing such that the image of the edge(s) is blurred on the plane of the detectors. In this case, the blurring may extend over a large portion of the detector.

Figure 19:
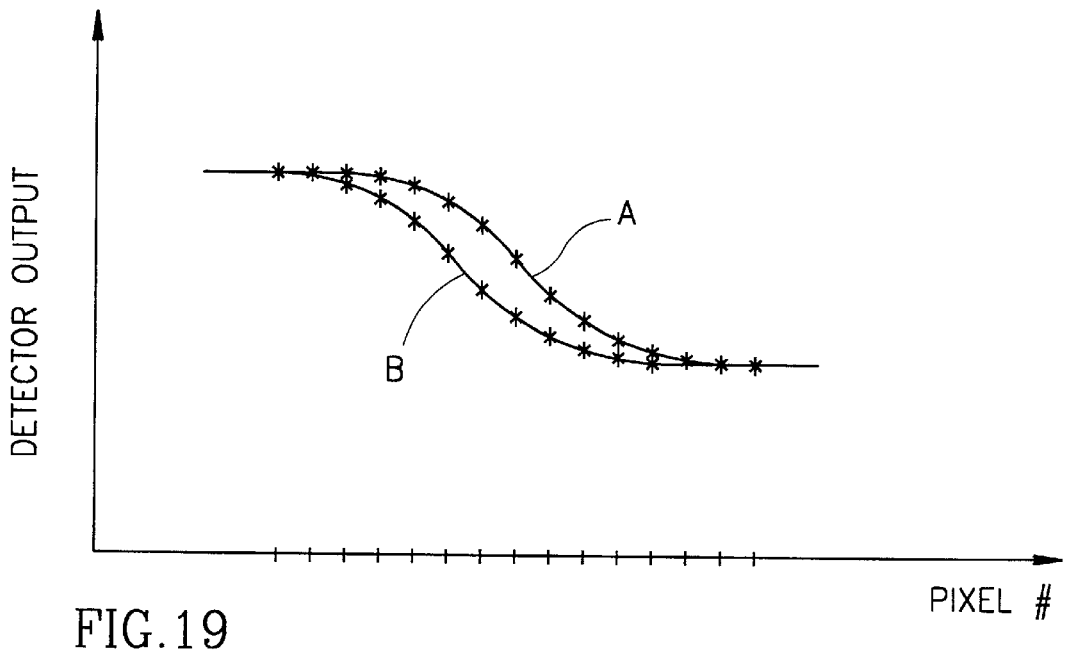
FIG. 19 illustrates data from an array of detectors which view a blurred edge, in two positions, according to a preferred embodiment of the invention.

It should be understood that when such a blurred image is viewed by the detectors, the edge, per se, cannot be accurately found. However, it should be understood that as the position of the edge and the detector is progressively changed there will be a smooth transition between a first condition in which the detector is minimally illuminated and a second condition at which the detector is maximally illuminated. If one considers the embodiments in which the detectors are angled with respect to the strips, then one realizes that the illumination of the detectors (for this blurred situation) which are near the edge will all be different. If one now considers a graph of detected light as a function of detector number, for a particular position, this curve will form an "s" curve as shown in FIG. 19, curve A. In curve A, a curve is fitted to the detected light data points which are indicated on the curve. In a practical situation there will be tens or even hundreds of data points for each curve. If the position is changed, the curve will continue to have the same shape, but will be displaced by an amount equal to the change in position as shown in curve B of FIG. 19. A measurement of this displacement on a scale of detector lengths is now possible by any one of a number of methods.

One possible method is to perform a cross-correlation between the curves. This method has the advantage of high accuracy since all the data is used. However, it requires substantial computation.

Another method is to determine the point of inflection of the "s" curve and to determine its movement. This can be determined by determining where the second derivative of the curve (generally computed numerically) is zero. Movement of this point corresponds to movement of the surface with respect to the detectors.

It should be understood that when a blurred image is utilized, generally none of the detectors are in the linear region as defined above. Furthermore, the method does not require that the detectors be rectangular and detectors of any shape may be used, so long as they all have the same shape and are equally spaced. Finally, the blurred method is useful for both linear and matrix arrays of detectors in which the line or rectangular coordinate of the array is angled with respect to the edge which is imaged.

Other methods of determining the displacement of the two curves may also be used in the practice of the invention.

It should be understood that while this last embodiment of the invention has been described with respect to blurring of an edge at the plane of the detectors, it is equally applicable to the case where the edges themselves are blurred or where the edges are replaced by a continuous graduation of brightness levels.

This same principle of utilizing the response of the array as a whole, rather than utilizing estimates of position derived from the individual detectors may also be used in other configurations, including configurations in which the image is not substantially blurred. Referring to FIG. 5 it is seen that the responses of the array of detectors of FIG. 4 produces a space-wave train of responses which moves as the detectors move in relation to the mask. The position may be considered to have a low resolution part, which corresponds to the cycle number of the wave train and a high accuracy and resolution part which is related to the position within the wave train. The position within the wave train may be determined by methods similar to those described above for the blurred edge and may also be determined based on the phase change of the wave train.

In one preferred embodiment of the invention, the high accuracy portion is equal to:

$$Y=DY*a*\tan(Sf/Cf)/2\pi, \quad (37)$$

where:

$$Cf = \sum_j Wj*Fj*\cos(j*DX*2\pi/DY), \quad (38)$$

and $$Sf = \sum_j Wj*Fj*\sin(j*DX*2\pi/DY) \quad (39)$$

and where:
- j denotes the individual detectors,
- Fj denotes the reading of the jth detector,
- DX is the pitch of (distance) the detectors along the axis of the array,
- DY is the pitch of (distance) between black strips on the mask along the distance of the array, and
- Wj are apodization weights to reduce the influence of the first and last few detectors.

As in the previous embodiments, the high accuracy portion is augmented by a low resolution measurement or determination of the cycle number.

Figure 20:
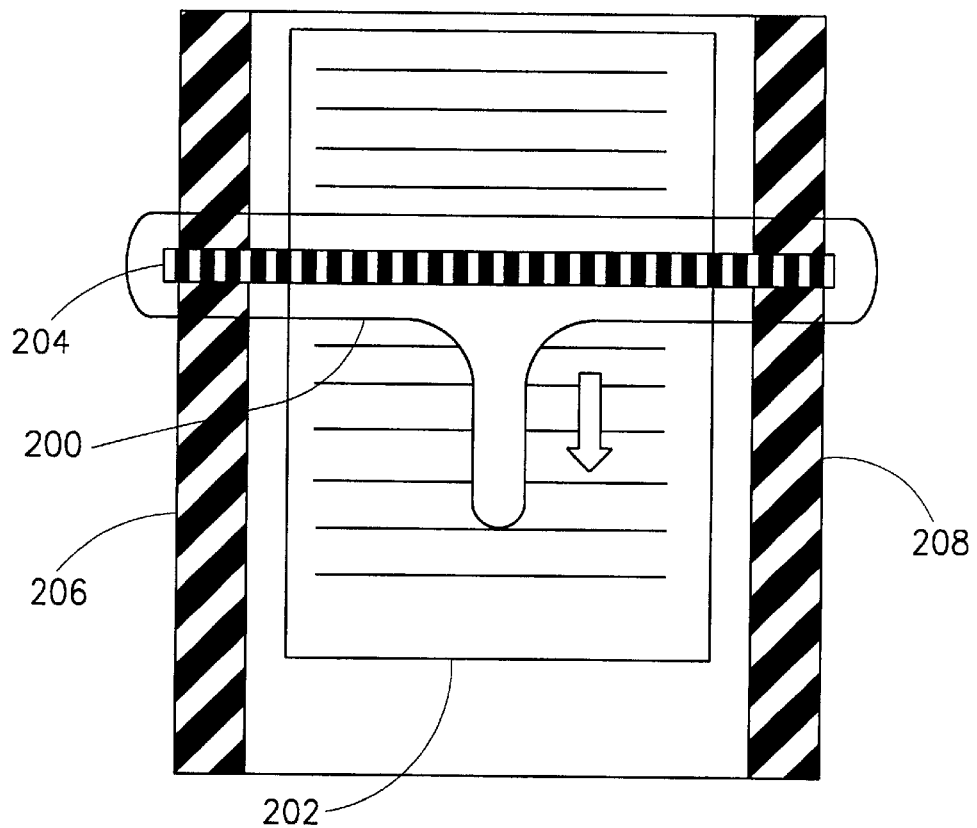
FIG. 20 illustrates a hand held scanner which utilizes a position and tilt determining scheme in accordance with a preferred embodiment of the invention.

The invention can also be effectively utilized to determine the position and tilt of a hand held scanner. FIG. 20 shows a preferred embodiment of the invention as applied to a hand held scanner. A hand held scanner 200 scans a page 202 of text or other material which is placed on a bed 202. Scanner 200 contains a linear array of detectors 204 which run the length of scanner 200 and the width of page 202 it being understood that the detectors are actually not visible in the view shown but are actually blocked by the housing of the scanner. A pair of strips 206 and 208 are place on the sides of the bed such that they are viewed by some of the detectors in array 204. It should be understood that while only a few detectors are shown, array 204 contains, typically, between 1000 and 5000 detectors such that a large number of detectors view page 202 and a smaller, but still relatively large number generally view strips 206 and 208.

The positions of the ends of the scanner are determined by measurements of the position with respect to the strips in accordance with any of the methods described above. Based on these measurements both the position and tilt of the scanner can be determined.

Many variations and combinations of the principles of the above described invention will occur to persons of the art. The examples given are not meant to be limiting as to the scope of the invention which is limited only by the claims.

What is claimed is:

1. A method of calibrating a position measurement device which device utilizes signals from a plurality of detectors, more than two of which view at least one edge between a dark region and a light region at any one position, comprising:
    measuring the signals of the plurality of detectors at a plurality of positions with respect to the edge; and
    calculating at least one average of some of the measured signals from individual ones of the detectors that do not view the edge at the position; and
    calibrating the individual detectors based on averages.

2. A method according to claim 1 wherein the at least one average comprises an average of signal values when the detector views only dark areas.

3. A method according to claim 2 wherein calibrating comprises normalizing signals from the detector when it view an edge, based on the at least one average.

4. A method according to claim 2 wherein the at least one average comprises an average of signal values when the detector views only light areas.

5. A method according to claim 4 wherein calibrating comprises normalizing signals from the detector when it view an edge, based on the average of signal values when the detector views only light areas and on the average of signal values when the detector views only dark areas.

6. A method according to claim 1 wherein the at least one average comprises an average of signal values when the detector views only light areas.

7. A method according to claim 6 wherein calibrating comprises normalizing signals from the detector when it view an edge, based on the at least one average.

8. A method according to claim 1 wherein calibrating comprises normalizing signals from the detector when it view an edge, based on the at least one average.

9. A method according to claim 1 and including:
    determining estimated positions of detectors that views both light and dark area at a given position;
    determining a most likely actual position for the given position; and
    determining correction factors for positions determined by individual detectors, based on the difference between the most likely position and the estimated positions.

10. A method according to claim 9 wherein determining a most likely actual position comprises averaging the estimated positions of a plurality of detectors.

11. A method according to claim 10 wherein determining correction factors comprises determining a consistent-error dimensional offset correction from an average dimensional offset for individual detectors.

12. A method according to claim 11 wherein determining correction factors comprises determining correction factors for non-consistent dimensional offsets for individual detectors.

13. A method according to claim 9 wherein determining correction factors includes determining a consistent-error dimensional offset correction from an average dimensional offset for each detector.

14. A method according to claim 13 wherein determining correction factors includes determining correction factors for non-consistent dimensional offsets for individual detectors.

15. A method according to claim 9 and including:
    determining refined estimated positions of detectors that views both light and dark area at a given position after applying said error correction to said position measurements;
    determining a refined most likely actual position for the given position; and
    determining correction factors for the positions determined by the individual detectors, based on the difference between the refined most likely position and the refined estimated position.

16. A method of calibrating a position measurement device which device utilizes signals from a plurality of detectors, more than two of which view at least one edge between a dark region and a light region at any one position, comprising:
    measuring the signals of the plurality of detectors at a plurality of positions with respect to the edge; and determining estimated positions of detectors that views both light and dark area at a given position;

determining a most likely actual position for the given position; and determining correction factors for the positions determined by the individual detectors, based on the difference between the most likely position and the estimated positions.

17. A method according to claim 16 wherein determining a most likely actual position comprises averaging the estimated positions of a plurality of detectors.

18. A method according to claim 17 wherein determining correction factors includes determining a consistent-error dimensional offset correction from an average dimensional offset for individual detectors.

19. A method according to claim 18 wherein determining correction factors includes determining correction factors for non-consistent dimensional offsets for individual detectors.

20. A method according to claim 19 and including:

determining refined estimated positions of detectors that views both light and dark area at a given position after applying said error correction to said position measurements;

determining a refined most likely actual position for the given position; and determining correction factors for the positions determined by individual detectors, based on the difference between the refined most likely position and the refined estimated positions.

21. A method according to claim 18 and including:

determining refined estimated positions of detectors that views both light and dark area at a given position after applying said error correction to said position measurements;

determining a refined most likely actual position for the given position; and determining correction factors for the positions determined by individual detectors, based on the difference between the refined most likely position and the refined estimated positions.

22. A method according to claim 17 and including:

determining refined estimated positions of detectors that views both light and dark area at a given position after applying said error correction to said position measurements;

determining a refined most likely actual position for the given position; and determining correction factors for the positions determined by individual detectors, based on the difference between the refined most likely position and the refined estimated positions.

23. A method according to claim 16 wherein determining correction factors includes determining a consistent-error dimensional offset correction from an average dimensional offset for individual detectors.

24. A method according to claim 23 wherein determining correction factors includes determining correction factors for non-consistent dimensional offsets for individual detectors.

25. A method according to claim 24 and including:

determining refined estimated positions of detectors that views both light and dark area at a given position after applying said error correction to said position measurements;

determining a refined most likely actual position for the given position; and determining correction factors for the positions determined by individual detectors, based on the difference between the refined most likely position and the refined estimated positions.

26. A method according to claim 23 and including:

determining refined estimated positions of detectors that views both light and dark area at a given position after applying said error correction to said position measurements;

determining a refined most likely actual position for the given position; and determining correction factors for the positions determined by individual detectors, based on the difference between the refined most likely position and the refined estimated positions.

27. A method according to claim 16 and including:

determining refined estimated positions of detectors that views both light and dark area at a given position after applying said error correction to said position measurements;

determining a refined most likely actual position for the given position; and determining correction factors for the positions determined by individual detectors, based on the difference between the refined most likely position and the refined estimated position.

* * * * *